United States Patent [19]
Rottenberg

[11] Patent Number: 5,640,434
[45] Date of Patent: Jun. 17, 1997

[54] MINIATURIZED NUCLEAR REACTOR UTILIZING IMPROVED PRESSURE TUBE STRUCTURAL MEMBERS

[76] Inventor: Sigmunt Rottenberg, 11 Riverside Dr., Suite 6 K West, New York, N.Y. 10023

[21] Appl. No.: 509,326

[22] Filed: Jul. 31, 1995

[51] Int. Cl.$^6$ ............................................. G21C 15/00
[52] U.S. Cl. .................. 376/366; 376/285; 376/401; 376/461; 376/292; 376/448; 376/449; 376/431
[58] Field of Search .................... 376/366, 285, 376/401, 461, 292, 448, 449, 431; 976/DIG. 74, DIG. 80, DIG. 83

[56] References Cited

U.S. PATENT DOCUMENTS

| | | | |
|---|---|---|---|
| 3,183,164 | 5/1965 | Guild et al. | 376/366 |
| 3,190,807 | 6/1965 | Bevilacqua | 376/366 |
| 3,230,149 | 1/1966 | Boiron | 376/366 |
| 3,584,903 | 6/1971 | Pritchard | 285/382.4 |
| 3,629,069 | 12/1971 | Wright | 376/203 |
| 3,663,366 | 5/1972 | Sauar | 376/457 |
| 3,801,443 | 4/1974 | Yasukawa et al. | 376/267 |
| 3,837,397 | 9/1974 | Pettigrew | 165/162 |
| 4,046,627 | 9/1977 | Middleton | 376/282 |
| 4,046,628 | 9/1977 | Middleton | 376/282 |
| 4,555,361 | 11/1985 | Buckley et al. | 252/626 |
| 4,627,069 | 12/1986 | Harvey et al. | 373/29 |
| 4,759,904 | 7/1988 | Gillett et al. | 376/353 |
| 4,911,880 | 3/1990 | Kasai et al. | 376/371 |
| 5,171,521 | 12/1992 | Moyer | 376/436 |
| 5,442,668 | 8/1995 | Todreas et al. | 376/367 |
| 5,513,234 | 4/1996 | Rottenberg | 376/366 |

*Primary Examiner*—Charles T. Jordan
*Assistant Examiner*—Meena Chelliah

[57] ABSTRACT

The present invention relates to a miniaturized nuclear utilizing improved pressure tube structural members. More particularly, the present invention relates to a new miniaturized nuclear reactor utilizing novel structural members that are used to support the loads and stresses of multiple nuclear reactor fuel channel pressure tubes and calandria tubes in a moderator.

16 Claims, 15 Drawing Sheets

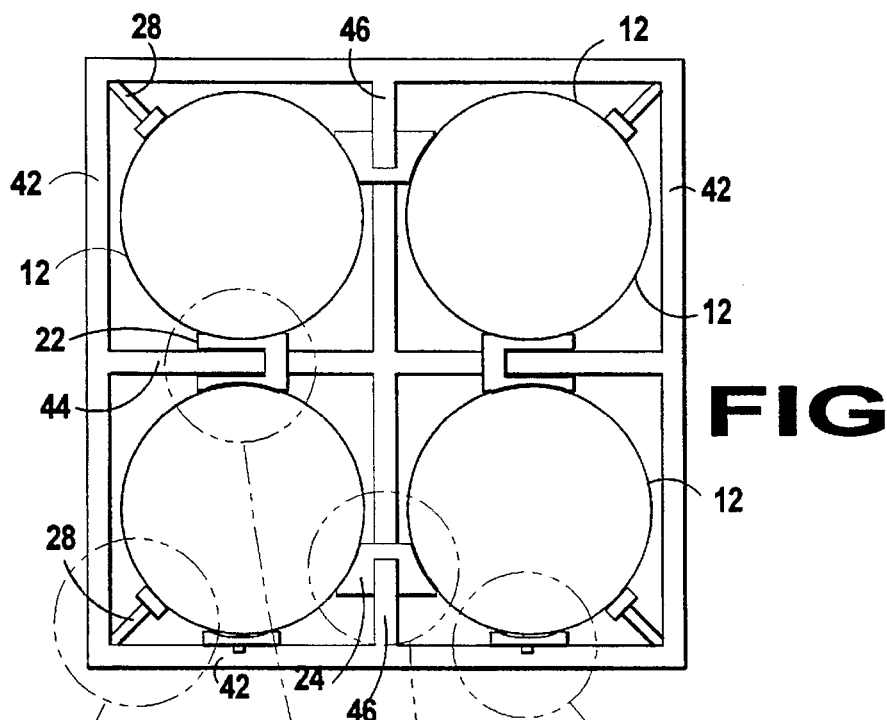
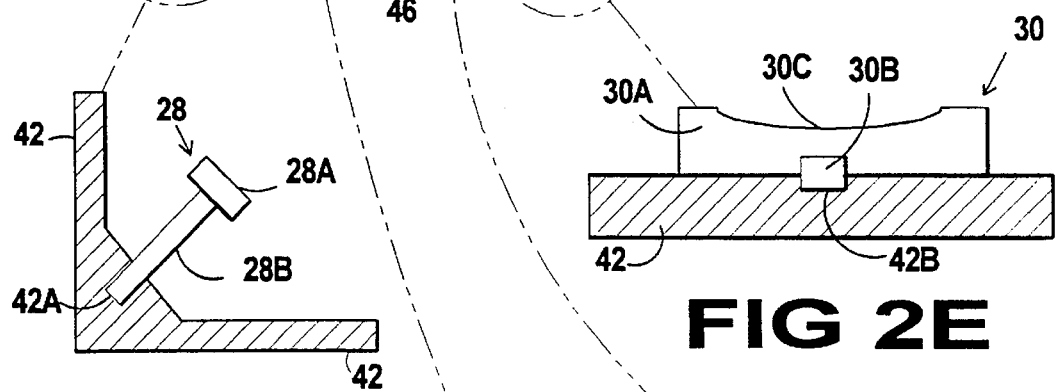
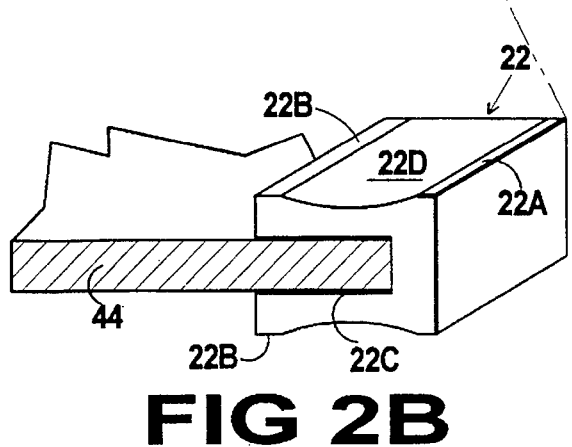
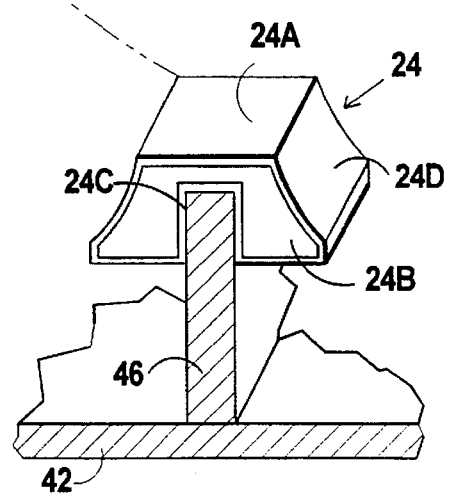

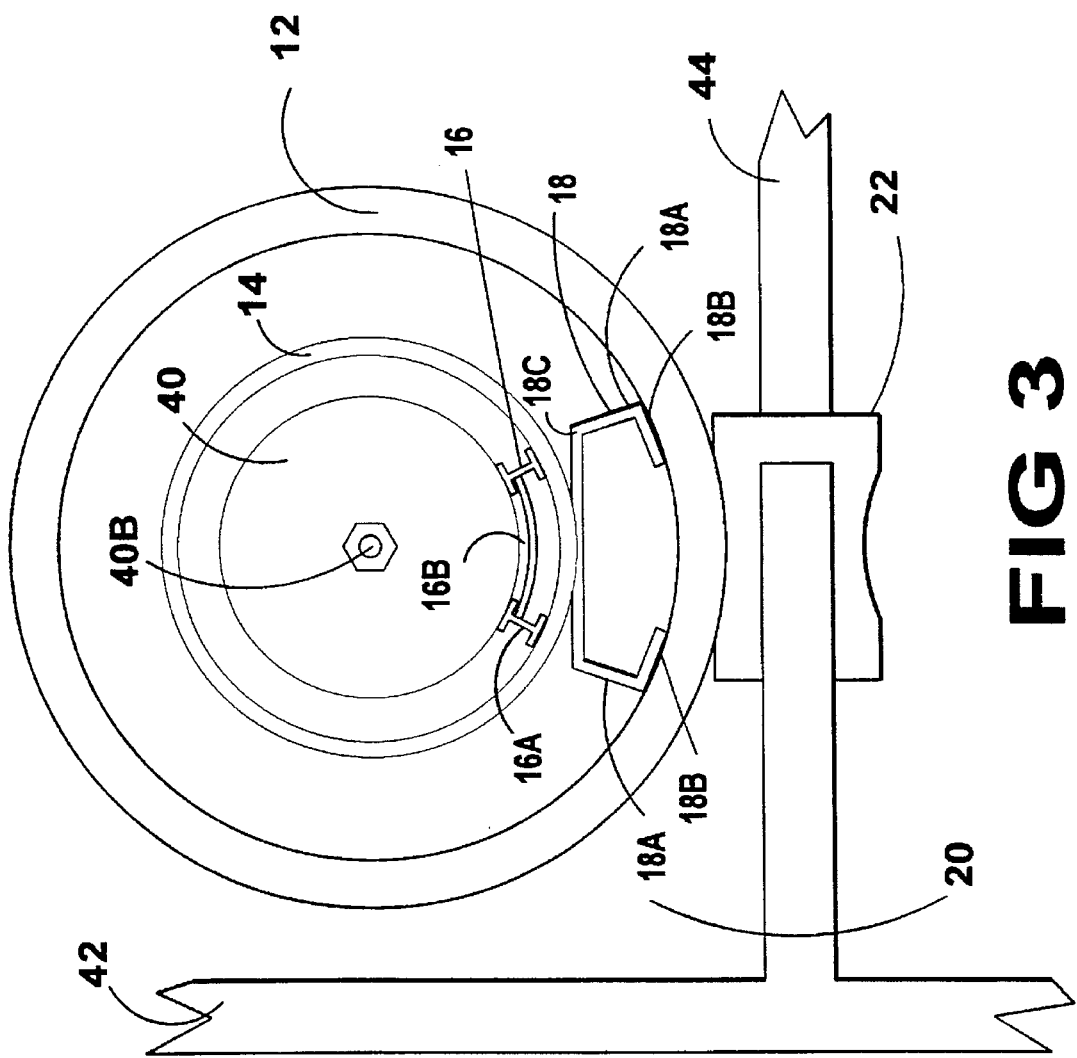

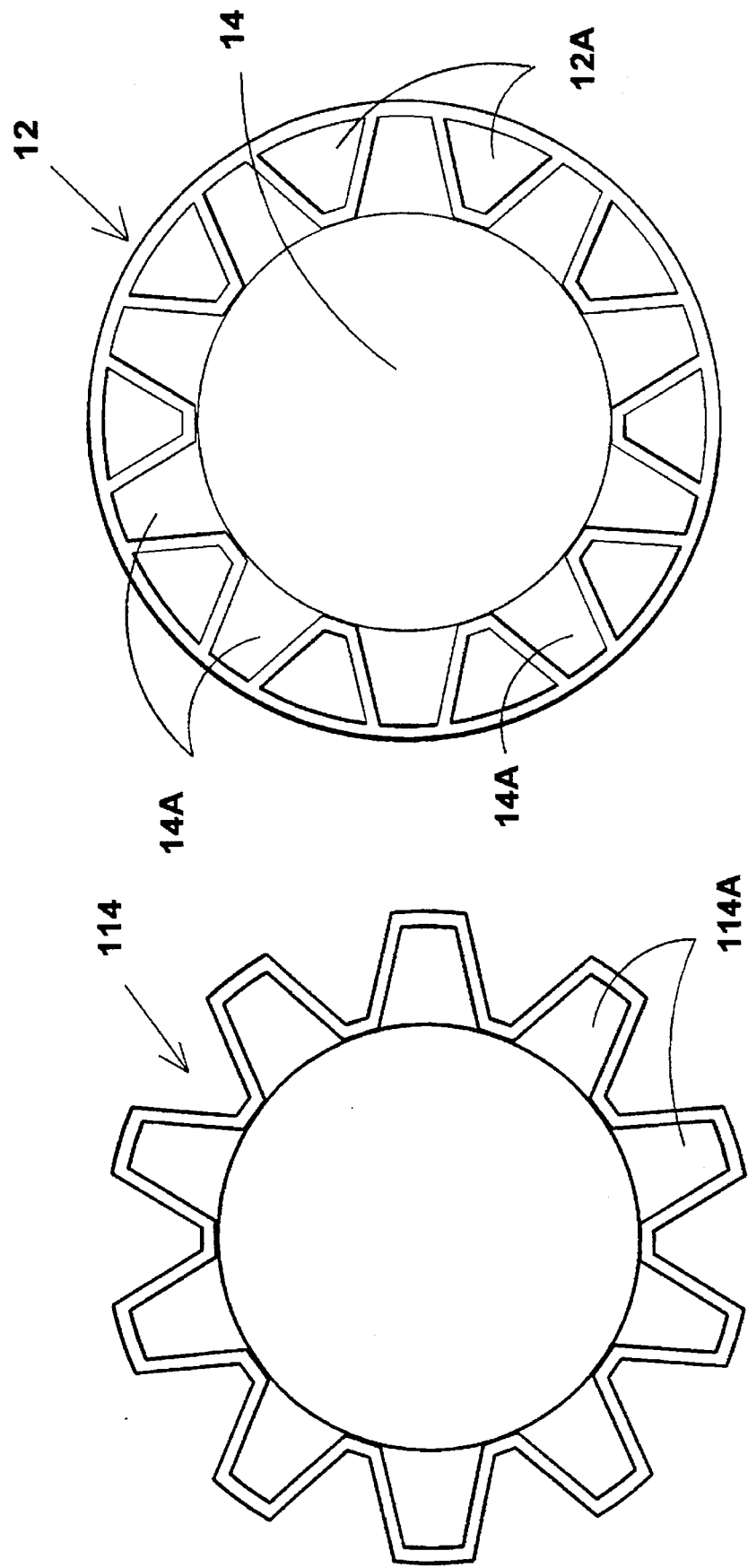

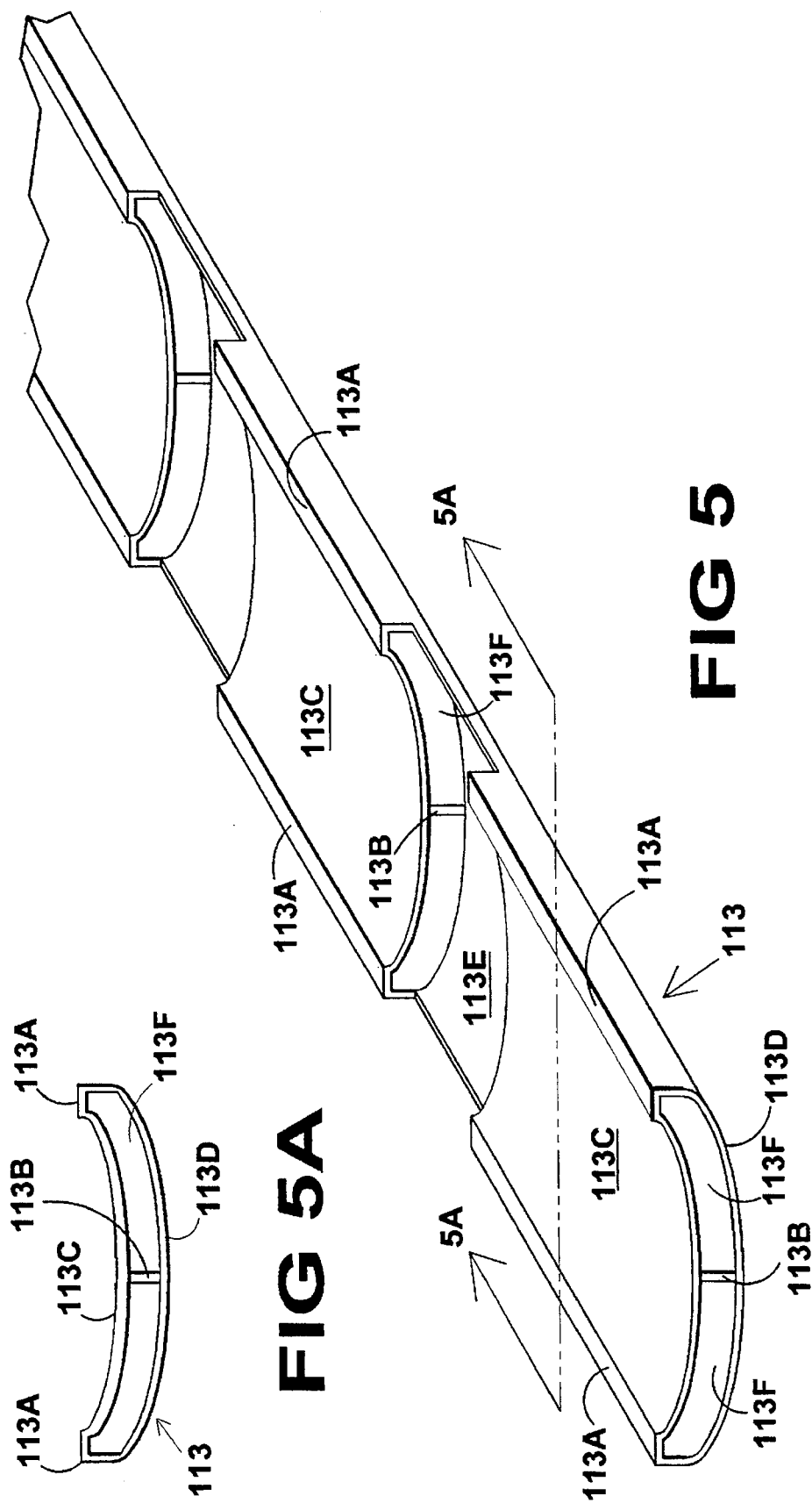

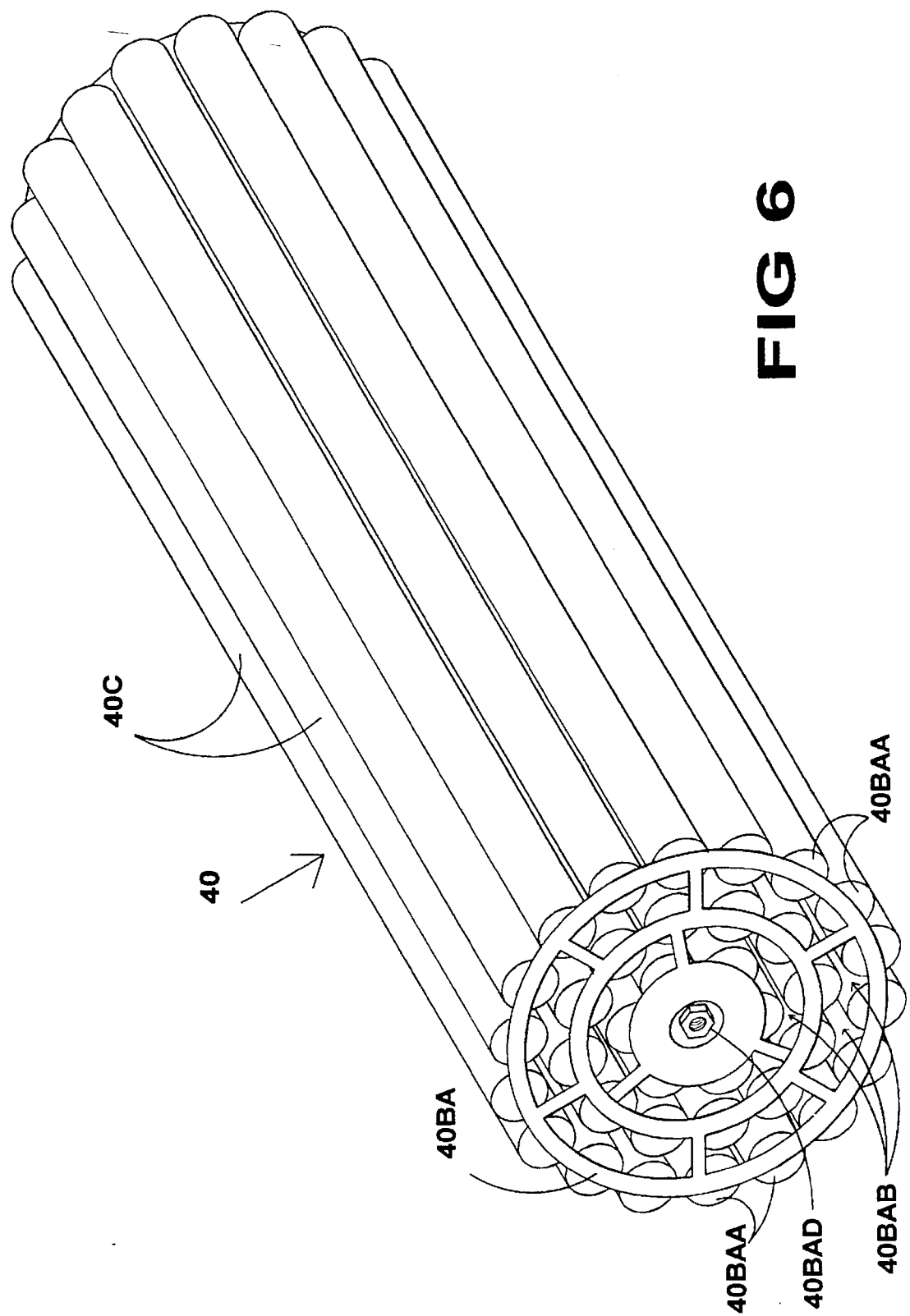

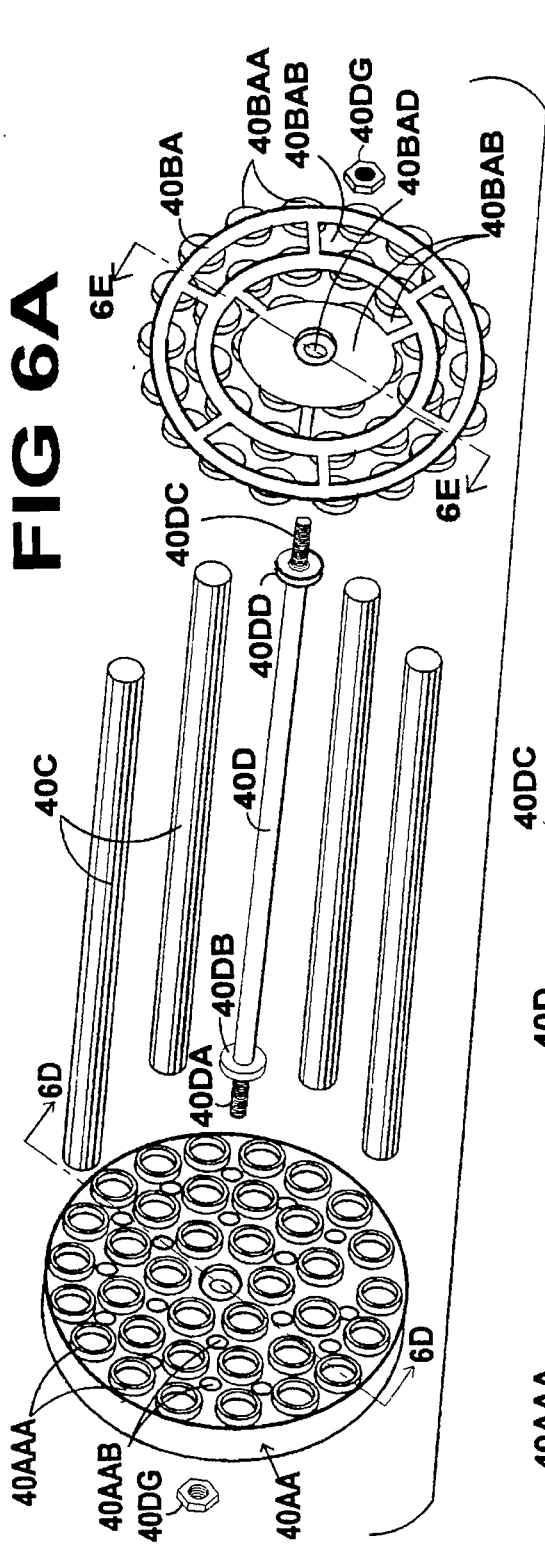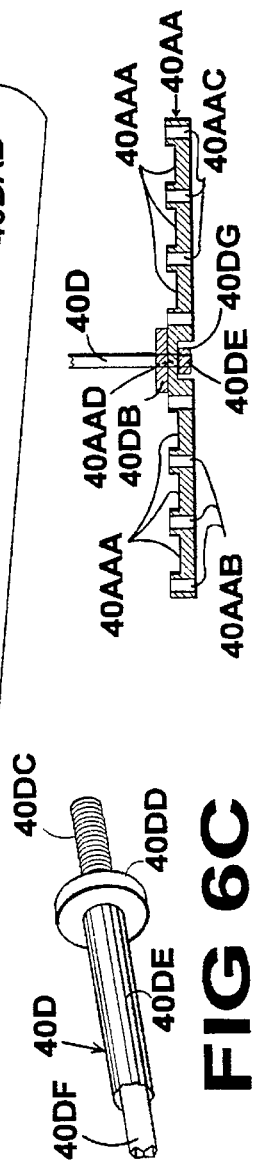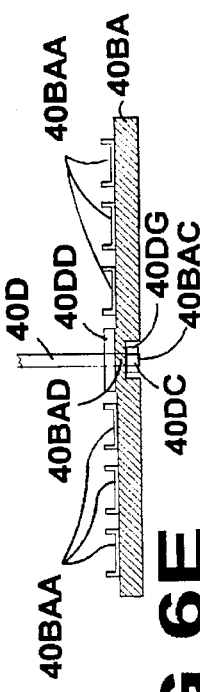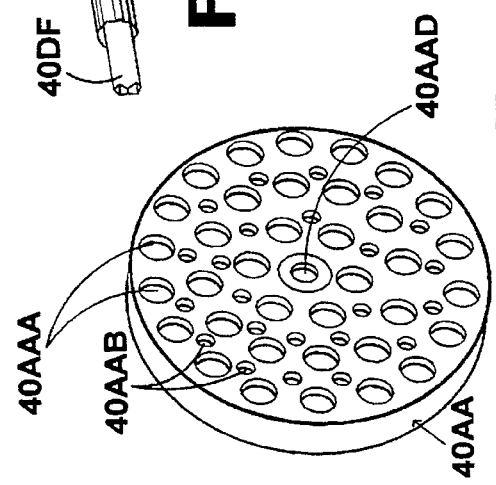

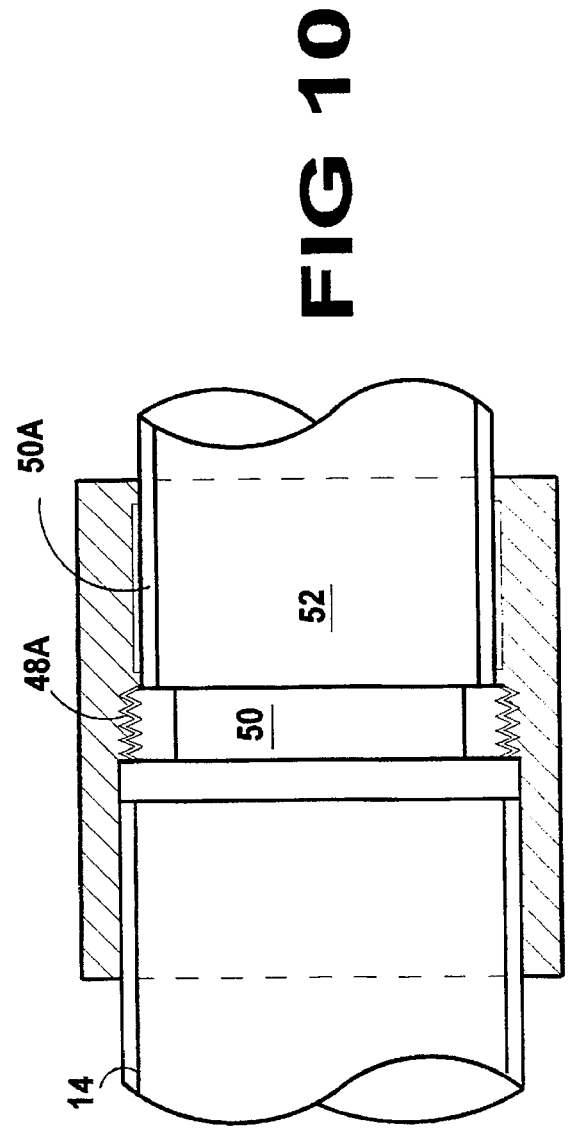
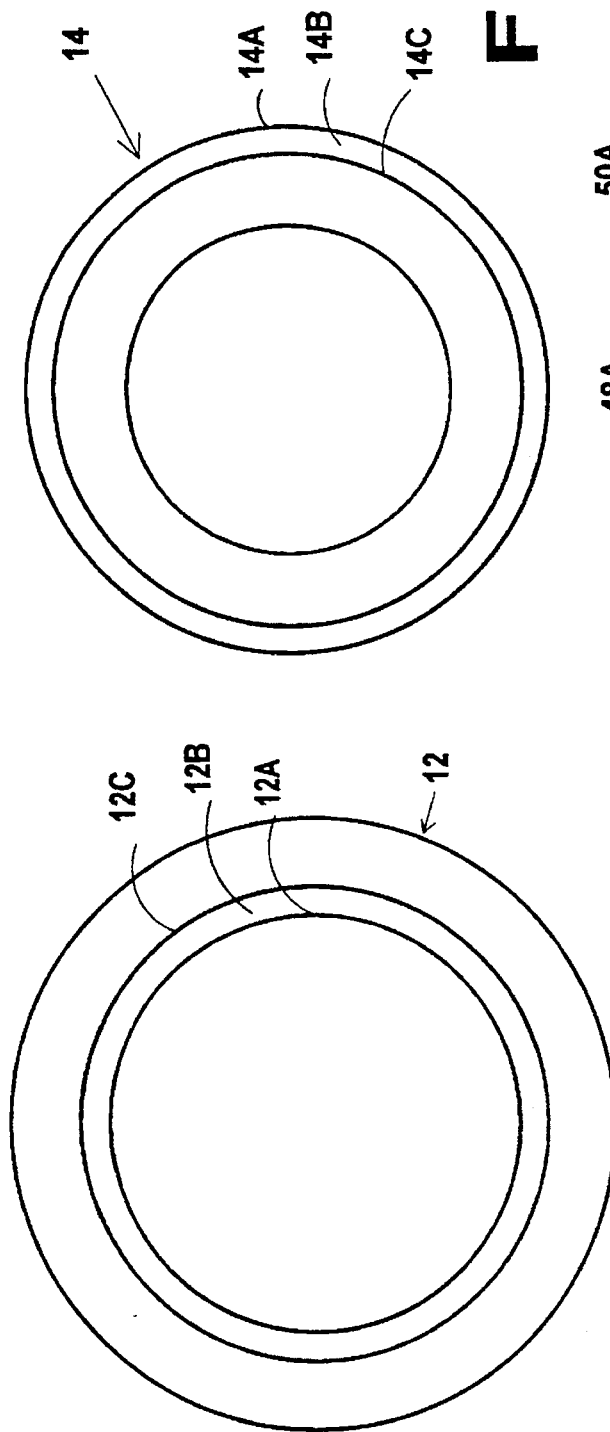
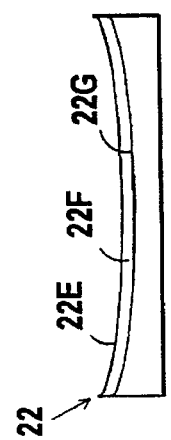

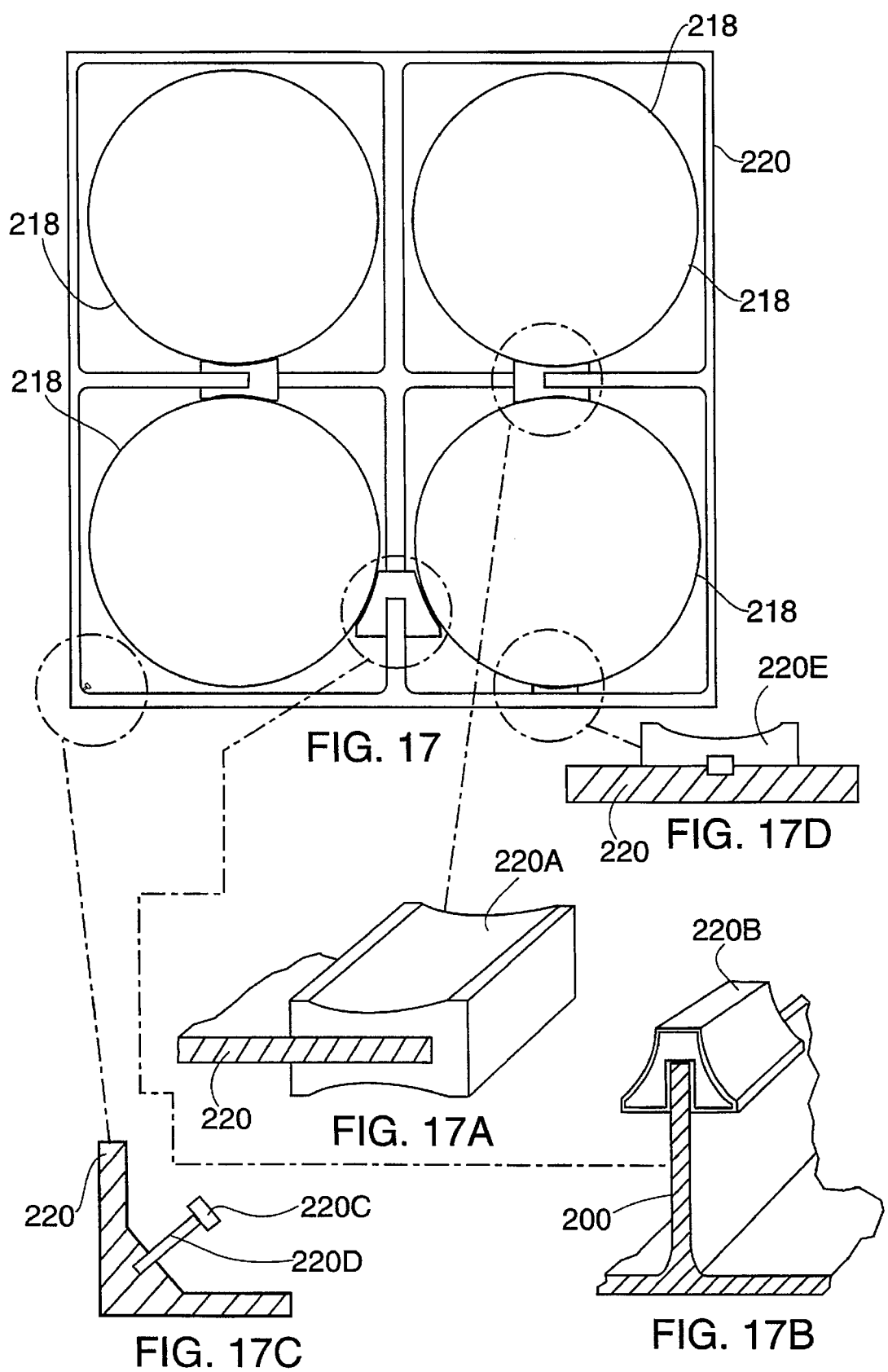

MINIATURIZED NUCLEAR REACTOR UTILIZING IMPROVED PRESSURE TUBE STRUCTURAL MEMBERS

BACKGROUND OF THE INVENTION

1. Field of the Invention

The present invention relates to a miniaturized nuclear utilizing improved pressure tube structural members. More particularly, the present invention relates to a new miniaturized nuclear reactor utilizing novel structural members that are used to support the loads and stresses of multiple nuclear reactor fuel channel pressure tubes in a confined area.

2. Description of the Prior Art

Nuclear power plants traditionally have been designed for achieving long term, safe, and reliable performance. To assure safety, the plants incorporate systems and procedures representing a studied anticipation of emergency conditions. design approaches will have considered theories or premises which may include, for example, design redundancies which are challenged by updated rules of performance as operating experience with nuclear power progresses. Thus, investigators in this power field continuously are called upon to develop improved analytic models of operation exhibiting improved bounding of operational factors and to further achieve higher levels of safety in view of changing rules of safety related performance. Because of the necessarily extensive time interval involved in developing or constructing a new nuclear power facility, for example such an effort may encompass ten years or more, and further in view of the numerous nuclear power facilities now in operation, these investigators typically are called upon to meet new rule criteria by modification of longexisting facilities. Retrofitting procedures can be quite extensive, calling for revised electrical power supplies, major valving replacements, and the like.

The nuclear industry has evolved a variety of reactor types. One such type finding substantial field use performs to produce steam for turbine drive within the reactor core itself and is referred to as a boiling water reactor (BWR). The reactor heated water of the BWR serves not only as working fluid, but also as a reaction moderator, and along with other parameters, its proper supply and application within the system necessarily has been the subject of safety requirements or rule generations by government regulatory agencies such as the Nuclear Regulatory Commission (NRC).

Typically, the general structure of a BWR nuclear system will include an upstanding reactor vessel which incorporates a lower reactor core structure beneath which are control rod drives. Above the core are, in order, a steam separator assembly and a steam dryer assembly leading to a steam outlet, above the reactor is a shield wall and outwardly of that a drywell. A pressure suppression chamber (wetwell), being torroidal in shape, is located below and encircling the drywell.

In more typical BWR installations, water coolant is heated in the reactor core to rise within the reactor vessel as a two-phase mixture of water and steam. This dual phase mixture then passes upwardly through the steam separator assembly and steam dryer structure to enter the steam line leading to a turbine. Following turbine drive, the steam is condensed to water and returned to the reactor by relatively large condensate and feedwater pumps of a feedwater system. The feedwater enters the downcomer region of the reactor, where it is mixed with the water returning from the steam separator and drying functions. The water in the downcomer region is circulated through the reactor core via the vertically oriented recirculation pumps which direct flow to the vertical jet pumps located between the core shroud and vessel wall (downcomer annulus). In typical fashion, two distinct recirculation loops with corresponding recirculation pumps are employed for this recirculation function.

In the event of some form of breakage or excursion generating malfunction, referred to as a "loss-of-coolant accident" (LOCA), designers anticipate that the relatively higher temperature-higher pressure water within the reactor will commence to be lost. A variety of safety systems and procedures may then be invoked both for containment and for thermal control of this LOCA. For the latter, thermal control, safety designs recognize that, while loss of the water moderator terminates the core reaction to eliminate a possibility of a nuclear incident, the momentum of generated heat or the residual energy within the reactor will remain of such magnitude as to require a cooling control to avoid for example, core melt down. In general, the amount of water within the containment system is more than adequate for this purpose, for example that contained in the suppression pool, or additionally, the condensate storage tank. To apply this water coolant for the safety purpose, a variety of safety related techniques or "emergency core cooling systems" (ECCS) have been developed to accommodate the LOCA. For example, core spray (CS) systems and low pressure coolant injection (LPCI) installations have been evolved in a variety of configurations.

The LPCI system incorporates, for example, four pumps which are activated by a safety system in the event of a coolant loss. Where the loss of coolant is of sufficient extent, and the vessel pressure remains high, for example in the event of a small pipe break then, an automatic safety system will function to depressurize the reactor vessel permitting the relatively lower pressure water supply pumps to operate to introduce water to the reactor. Because the recirculation system earlier described is ideally structured for this purpose, generally it is used by the LPCI system for water introduction under ECCS conditions.

Safety designs heretofore have recognized, however, that a recirculation loop may be broken under a LOCA condition. Thus, the pumping of water into that loop under such a LOCA condition may have no effectiveness. Accordingly, the LPCI systems have been equipped with a recirculation loop selection feature termed "loop selection logic" to avoid such conditions. This safety control detects the broken recirculation loop and initiates a procedure injecting water into the redundant, intact recirculation loop by actuating appropriate LPCI injection valves. Experience with such LPCI loop selection features have shown them to be complex and difficult to test and maintain. Under more current rule-based requirements, the design must accommodate for such occurrences as valve failure and the like. However, to function more effectively under current rules, procedures for retrofitting existing facilities to update them are elaborate and quite expensive, implementation involving such activities as recabling, pump reconnection activities and the like. Thus, an approach has been sought by investigators which offers operators the opportunity to eliminate the requirement for a loop selection logic regimen and associated costs therewith while improving the reliability of the LPCI system.

Numerous innovations for structural member for nuclear reactor pressure tubes have been provided in the prior an that are described as follows. Even though these innovations may be suitable for the specific individual purposes to which they address, they differ from the present invention as hereinafter contrasted.

In U.S. Pat. No. 3,584,903 titled ROLLED CHANNEL JOINTS by inventor James David Prichard, a strong and leak-free hub assembly for use with the pressure tubes of a nuclear reactor is disclosed in which the hub includes a hard insert having at least one groove formed in it, the hardness of the insert being greater than the hardness of the tubular element with which it is joined. Typically, the hub is formed of stainless steel, the insert is formed of surface hardened stainless steel and the tubular element is a zirconium-niobium alloy. The insert has a hardness greater than the hardness of the tubular element. The present invention differs from the above described patent due to the features of the joint assembly, the present invention utilizes a threaded joint connector to join a fuel channel pressure tube to the reactor system.

In U.S. Pat. No. 4,555,361 titled METHOD OF REDUCING THE VOLUME OF SOLID RADIOACTIVE WASTE by inventor Leo P. Buckley et at., combustible, solid radioactive waste, such as paper, plastics, rubber, cloth and wood are reduced in volume to ash residue using pyrohydrolysis, a method which combines pyrolysis of the waste in a vessel at temperatures in the range of 500° to 700° C. and gasification of residual carbon with superheated steam. Pressures of 1.0 to 3.5 Mpa are used with steam flows in the range 4 to 50 grams/second/cubic meter so that carbon containing components of the waste are removed as gaseous decomposition products in the form of carbon monoxide and hydrogen leaving an ash residue. The present invention differs from the above described patent due to the features of a method of reducing the volume of ash produced whereas the present invention describes utilizing glass and other impurities which when reacted with the fuel pellets form a less radioactive substance.

In U.S. Pat. No. 4,627,069 titled JOULE MELTER FOR THE PROCESSING OF RADIOACTIVE by inventor Keith B. Harvey et at., the joule melter has an outer cylindrical electrode which forms the outer wall of the melt containment, an inner cylindrical electrode which protrudes upward in the containment and forms the outlet for the melt, thus, also determining the depth of the melt. A nonconducting sealing material forms a base plug between the electrodes. A cylindrical electrically conductive baffle is located between the electrodes and includes an opening which allows the melt to flow from near the outer electrode where the melt material is first inserted into the melter, to the inner electrode which is the outlet. In addition to the inner and outer electrodes, the baffle may be connected to a power supply to modify the currents flowing at each of the electrodes. The present invention differs from the above described patent due to the features of melting the radioactive waste whereas the present invention describes utilizing glass and other impurities which when reacted with the fuel pellets form a less radioactive substance.

In U.S. Pat. No. 3,837,397 rifled TUBE BUNDLE ASSEMBLY by inventor Michael J. Pettigrew, a robe bundle assembly, for example, a heat exchanger tube bundle or a nuclear fuel element tube bundle, comprises a bundle of laterally spaced tubes, a frame around the outermost tubes, and a lattice of wire cables with their ends held against lateral displacement by the frame and the tubes in the lattice interstices. The cables are deflected round a portion of each tube to space the tubes from one another, and the cables are preferably tensioned against the frame for this purpose. The present invention differs from the above described patent due to the features of the cable matrix whereas the present invention describes utilizing a moderator comprising separate compartments within which the calandria tubes and fuel channel pressure tubes are contained. In addition, the separation of the calandria tubes and the fuel channel pressure tubes are accomplished by a novel support system explicitly described herein.

In U.S. Pat. No. 5,213,757 rifled METHOD FOR FIXING A SPRING PACKAGE TO A TOP NOZZLE IN A FUEL ASSEMBLY OF A NUCLEAR POWER REACTOR by inventor Lennart Ohman, a method of fixing a spring package to a top nozzle in a fuel assembly of a nuclear reactor wherein the fuel assembly comprises fuel rods, guide tubes and spacers arranged in a bundle between a top nozzle and a bottom nozzle wherein a T-shaped slot in milled out in a clamp which is welded to or forms an integral part of the top nozzle for receiving one end of the spring package, the end of the spring package is then inserted into the slot and the end is then fixed in the slot by means of a locking pin. The present invention differs from the above described patent due to the features of the bundle whereas the present invention describes utilizing a moderator comprising separate compartments within which the calandria tubes and fuel channel pressure tubes are contained. In addition, the separation of the calandria tubes and the fuel channel pressure tubes are accomplished by a novel support system explicitly described herein.

In U.S. Pat. No. 5,213,755 titled LOW PRESSURE COOLANT INJECTION MODIFICATION FOR BOILING WATER REACTORS by inventor David M. Kelly et al., a conventional low pressure coolant injection system for boiling water reactors is provided. With the modification, the cross tie conduits and associated valves remain open between two LPCI divisions. On the occasion of an LOCA, the LPCI pumps are activated and injection valves for each of the LPCI divisions are opened to commence coolant injection in the recirculation loops in simultaneous fashion. However, the rate of flow of water coolant within each injection system is controlled by a hydraulic resistance, which is selected to achieve reactor core cooling within requisite quantifies from one injection path. Thus, even though coolant water may flow through a rupture within one recirculation loops, sufficient water will be injected in the other loop to achieve core cooling. The present invention differs from the above described patent due to the features of the coolant system whereas the present invention describes utilizing a moderator comprising separate compartments having coolant systems flowing therein within which the calandria tubes and fuel channel pressure tubes are contained and are maximally cooled due to the novel features of the present invention. In addition, the separation of the calandria tubes and the fuel channel pressure tubes are accomplished by a novel support system explicitly described herein which achieve this cooling maximization.

In U.S. Pat. No. 4,788,033 titled CALANDRIA by inventor Luciano Veronesia calandria for use in conducting the hot coolant of a nuclear reactor transversely. The calandria includes an upper plate and a lower plate which support tubes. The plates and tubes are enclosed in a shell which extends above the upper plate and has a supporting flange. The lower plate has holes for transmitting coolant into the region between the plates. The shell has openings whose boundaries mate with the outlet nozzles of the reactor. The tubes are of stainless steel and are dimensioned so that they have mass, stiffness and strength such that they are not subject to failure by the transverse flow of the coolant even at a high velocity. The present invention differs from the above described patent due to the features of the coolant system whereas the present invention describes utilizing a moderator comprising separate compartments having coolant systems flowing therein within which the calandria tubes and fuel channel pressure tubes are contained and are maximally cooled due to the novel features of the present invention. In addition, the separation of the calandria tubes and the fuel channel pressure tubes are accomplished by a novel support system explicitly described herein which achieve this cooling maximization.

In U.S. Pat. No. 4,788,032 rifled REACTOR WITH FLOW GUIDANCE IN THE UPPER INTERNALS by inventor Jacques Baujat et al., a nuclear reactor has a pressure resistant vertical vessel with inlet and outer pipes situated at the same horizontal level. It also includes internals having a barrel supporting the core and defining with the vessel a down flow path for the coolant from the inlet pipes towards a space under the core and upper internals defining a flow path for the coolant leaving the core, above the latter, and flowing towards the outlet pipes. The upper internals include dividing walls defining circumferentially distributed volumes located at the common level of the pipes and each over a different angular sector. Some volumes belong to the initial part of the down going coolant path and the others force part at least of the coolant leaving the core to follow a path which is successively directed upwardly then curving towards the outlet pipes. The invention is particularly suitable for use in pressurized water reactors. The present invention differs from the above described patent due to the features of the coolant system whereas the present invention describes utilizing a moderator comprising separate compartments having coolant systems flowing therein within which the calandria tubes and fuel channel pressure tubes are contained and are maximally cooled due to the novel features of the present invention. In addition, the separation of the calandria tubes and the fuel channel pressure tubes are accomplished by a novel support system explicitly described herein which achieve this cooling maximization.

In U.S. Pat. No. 4,759,904 rifled PRESSURIZED WATER REACTOR HAVING IMPROVED CALANDRIA ASSEMBLY by inventor James E. Gillet et al., a calandria assembly is received within the pressure vessel of a nuclear reactor system, at an elevation corresponding to the level of the outlet nozzles of the vessel, and receives pressurized coolant traveling in an axial flow direction within the vessel and turns same to a radial direction for exit though the outlet nozzles. Hollow tubes mounted in parallel relationship at opposite ends to first and second plates of the calandria in conjunction with a cylindrical skin of cylindrical configuration joining the first and second plates of the calandria, present a redundant structure introducing the potential of thermal stresses, which are limited by selection of the pattern of flow holes in the lower plate and the provision of flexible annular weld joints of J-shaped configuration between the lower ends of the calandria tubes and the lower, second calandria plate. The present invention differs from the above described patent due to the features of the coolant system whereas the present invention describes utilizing a moderator comprising separate compartments having coolant systems flowing therein within which the calandria tubes and fuel channel pressure tubes are contained and are maximally cooled due to the novel features of the present invention. In addition, the separation of the calandria tubes and the fuel channel pressure tubes are accomplished by a novel support system explicitly described herein which achieve this cooling maximization.

In U.S. Pat. No. 4,284,475 rifled WEAR SLEEVE FOR CONTROL ROD GUIDE TUBE by inventor Andrew J. Anthon, a wear sleeve for a guide robe in a nuclear fuel assembly, and a method of installing the sleeve. The sleeve is an elongated metal cylinder having an upper portion adapted to be suspended from the upper end of the guide tube, and a lower portion adapted to be permanently deformed into interference fit with the walls of the guide tube whereby the sleeve may be secured against vertical movement. The method of installing the sleeve includes the steps of suspending the sleeve from the upper end of the guide tube, then expanding a selected lower surface of the sleeve until the sleeve is permanently deformed, whereby an interference fit between the sleeve and robe is formed. The present invention differs from the above described patent due to the features of the joint assembly, the present invention utilizes a threaded joint connector to join a fuel channel pressure tube to the reactor system.

Numerous innovations for structural member nuclear reactors utilizing nuclear reactor pressure tubes have been provided in the prior art that are adapted to be used. Even though these innovations may be suitable for the specific individual purposes to which they address, they would not be suitable for the purposes of the present invention as heretofore described.

SUMMARY OF THE INVENTION

The present invention describes new shapes of fuel tubes. The advantages are that the fuel tubes are stronger and less brittle, there is more surface contact area for heat exchange to take place and therefore, the tubes' new shape is more efficient.

For purposes of miniaturization, the fuel tube can be made from any type of material-metal, metal alloys, ceramic, glass, fiberglass, carbon-graphite, epoxy and/or plastic composites or a combination of these materials with or without reinforcements. The surfaces could be enameled, coated, lined and/or cladded. The shapes would be most applicable to the miniaturization, but could be used in the larger scale reactors, USING HIGH ENRICHED URANIUM FUEL.

In the present invention, novel fuel bundles for use in miniaturized reactor are described. The novel fuel tube design is to solve partially the problem of disposal of the spent fuel. The secondary benefit is the increased safety of operation of the reactor, in case of accidental meltdown.

The present invention describes novel Support pads to hold the fuel tubes in place. The pads are of different shapes and sizes. Pads provide continuous support, intermediate support, are integral with Structural Member and are inserted inside the fuel tube. The pads are applicable to miniaturization. All surfaces and parts of the reactor and/or fuel tubes could be coated, cladded, enameled or lined.

The rolled joint connection at the end of the fuel channel pressure tube (FCPT) was developed to facilitate removal and replacement of the fuel channel pressure tube (FCPT). This is important in design of miniaturized reactors and in maintenance of all integral pans contained therein.

The advantages of the novel Structural Member Metal Tubes are as follows:

1. PROTECTION OF SURFACE BY LINING OR COATING

The interior surface and other integral parts contained therein can be further protected by adding a protective coating or lining of the interior surface of the member metal tube, to prevent irradiation of the metal tube from the FCPT. The coating or lining of the interior surface should be of a material inert to irradiation to provide positive protection. The use of coating, lining, etc. is novel and can be implemented because of the novel design of the novel Structural Metal Member. The deflection and bending stresses inherent therein would be nominal with the present design of the invention. Therefore, the coating or lining would not develop cracks, peel or other structural and/or functional defects.

In the prior art, routinely, the calandria tube would deflect and bend to the extent that some coating or lining could not have been used. This obvious disadvantage would be overcome by the present invention.

2. FUEL CHANNEL PRESSURE TUBE (FCPT)

The present invention reduces friction for movement of expansion and/or rotation of the fuel channel pressure tubes as follows:

A) FCPT made from ceramic or any Irradiation-Inert Material such as glass, fiberglass, carbon-graphite, epoxy, metal alloys, or plastic composites in accord with the following features:

1. Coat exterior surface of the FCPT to reduce friction around the FCPT.
2. Provide steel bends where the FCPT comes in contact with intermediate support pads.
3. Coat the steel bends.

B) FCPT Made From Metal Subject to Irradiation in accord with the following features:

1. Coat exterior surface of the FCPT to reduce friction.
2. Coat to prevent irradiation of support pads and spacers.
3. Coat the ends of the FCPT to prevent irradiation of the tube extension at connection with FCPT.

3. NEW SUPPORT PADS AND SPACERS

The support pads inserts are one-piece made full length (20) feet of FCPT to be inserted into the new structural metal member inside the tubes. The support pads once inserted to be fastened to the new structural metal member. The fastener (s) should prevent the sliding of the pad out of position. The spacers could be intermittently spaced and do not have to be the full length. They would be held in position by being attached to the full length support pad or attached to the new structural metal member.

The support pads could be an integral part of the new structural metal member. The configuration where the web of member penetrates to the inside of the tube as depicted in the drawings. The part projecting part inside the tube to be shaped as support pad or as spacer depending on location.

4. SUPPORT PADS AND SEPARATOR FOR FCPT

A) FCPT Made of Ceramic, etc.

1. The support pads and separators could be made of metal and/or metal alloys.
2. The metal should be coated at contact with the FCPT to reduce friction.
3. The pads should be grooved or have depressions to allow for circulation and cooling.

B) FCPT Made of Metal

1. The support pads and separators should be made out of material ( ceramic, glass, etc.) are inert to irradiation from FCPT.
2. The metal support pads and superstars should be coated or lined with material inert to irradiation from FCPT.
3. The surface of support pad and separators in contact with FCPT should be coated to reduce friction.
4. The pads should be grooved or have depressions to allow for circulation and cooling.

C) FUEL BUNDLES-SUPPORT PADS INSIDE THE FCPT

The fuel bundles inside the FCPT rest directly on the bottom of the robe. The fuel bundles should rest on pads to protect the surface of the FCPT from abrasion, wear and tear. The abrasion is caused by the fuel bundles sliding during loading and unloading and due to the elongation of the FCPT and vibration, etc. The pads would have a shape of rails (two) full length of the FCPT secured at ends against moving out of position. The pads should be used with the FCPT made from metal, ceramic, glass, etc. The pads would also protect the ceramic and glass FCPT from Chipping and cracking.

5. FCPT MADE OUT OF GLASS

Advantages of using glass for making the fuel channel pressure tubes. The use would increase safety and reduce radiation emission in case of a meltdown. The glass, during the extreme heat due to meltdown, would melt. The melted glass would encapsulate the fuel bundles and pellets. This would reduce radiation emission from the nuclear fuel and contamination of parts of the reactor. It would minimize the damage to the FCPT effected by meltdown and allow for repairs of the reactor by replacement of the FCPT affected by the meltdown.

6. THE NOVEL REACTOR UNIT

The new reactor unit would house four, six, or eight FCPT within it, and be used as a reactor. The unit will be a self contained miniature reactor.

The exterior shape is the reactor can be round square, rectangular triangular and polygonal and/or any combination thereof. The tubes as shown in FIG. 8 are novel calandria tubes resting on support pads.

Inside the calandria tubes are fuel channel pressure tubes. The use of glass for FCPT would have the advantage of safety, and reduction of emission of radiation during a melt down. In case of meltdown, the metal reactor would be encased to prevent radiation passing to the exterior and placed inside a concrete vault similar to a transformer vault in case of malfunction and/or meltdown the radiation will be contained therein.

When the fuel is used up (spent) it will be removed and replaced to provide continuous service of the miniature reactor during normal usage.

The present invention of the novel nuclear reactor has support pads for Calandria Tubes. The support pads as shown in FIG. 7 could be used to support the calandria tubes. The load of the fuel bundles inside the FCPT would be transferred to the Calandria tubes and from the Calandria tubes to the new unit reactor. In addition, the pads could be in the shape of two rails on which the bundles could readily slide.

The present invention describes novel spent fuel disposal. The fuel pellets of spent fuel could be encapsulated in melted glass for disposal. This could be done individually or in bundles. The glass encapsulated fuel would be encased in concrete blocks to be stacked up in storage. The blocks would be made from contaminated (material) concrete, ceramic, and recast into blocks.

The most radioactive is the fuel having a protective shield from a low contaminated material made in shapes for easy shipping, handling and storage. It would be fully automated, requiring no handling by humans. The orderly fashion of disposal would require less space, be economical and would not represent danger to the surrounding area.

When the fuel is spent, the fuel bundles are removed from the reactor. The spent pellets should be removed from the bundles. The pellets should intentionally undergo a meltdown, and in the process, some contaminant be added to prevent reprocessing the spent uranium into a bomb grade material (national security reasons) and the pellets should be encapsulated with a glass coating to reduce radiation emission. The pellets should be placed in a storage container. This container should be manufactured from radiation contaminated material. The container could be of metal and/or concrete. The size that could be handles for transport and to put on shelf or warehouse. The process described could be fatty automated and done by remote control.

The advantages are that the radiation contaminated material would be utilized and the waste disposal will be done in an orderly and controlled manner. It would reduce the amount of waste, reduce the space to store, and would reduce the amount of radiation from the spent fuel. The controlled and orderly manner of handling and storage would increase safety and protect the environment.

The present invention describes disposal of spent fuel being encased in melted down glass. Could be used to dispose of nuclear wastes. The product would be radioactive glass blocks that would have to be stored for safety. The glass blocks would be stable and would not be radioactive molecules leaking. This would be stable for a very, very long time.

The present invention describes a novel, state of the art fuel bundle. The fuel bundle is approximately 20 inches long and 4 ⅝ inches in diameter. The Cylindrical fuel pellets are approximately ¾ inches long and ½ inch in diameter. The fuel element is a metal fuel.

In the present invention, the pads are of different shapes and sizes. Pads provide continuous support, intermediate support, are integral with Structural Member and are inserted inside the tube. The pads are applicable to miniaturization.

Another feature of the present invention, is all surfaces and parts could be coated, cladded, enameled, or lined as stated in the text of the first patent and this application.

An additional feature of the present invention is the rolled joint connection at the end of the fuel channel pressure tube was developed to facilitate the removal and replacement of the fuel channel pressure tube. This is important in design of miniaturized reactors and in maintenance of all other sizes of reactors, and applies to the use of the fuel channel pressure tube made of all materials. The spent fuel after second use would be less radioactive. It would pose a lesser problem of storage and handling.

One benefit of the present invention is in making use of a currently discarded material namely spent fuel in highly radioactive state.

An additional benefit of the present invention is in reduction of storage volume of highly radioactive spent fuel. The spent fuel should be used as fuel for "heating" the hot water produced by the second use of fuel in the unminiaturized reactor, would be passed through a heat exchanger and returned to the reactor. The heated water from the heat exchanger could be used to heat apartment and/or office buildings and/or generate electricity and/or generate heat for green houses to produce. The heated water could be convened to steam and utilized as mechanical energy. The spent fuel after first use is still highly radioactive, but not sufficient for production of electricity. The spent fuel when used the second time is less radioactive, and the reactor would also operate at a lower pressure.

Still another feature of the present invention is addressed to a structural member for nuclear reactor pressure tubes and method which provides effective insertion of water coolant within the recirculating loops of conventional boiling water reactors, but without resorting to complex loop selection logic. Through analysis by modeling and the like of the requirements of the a structural member for nuclear reactor pressure tubes in terms of time for complete coolant injection and in terms of the required quantity of injected fluid, flow rates of injection are derived and requisite quantities of coolant are determined and identified such that the a structural member for nuclear reactor pressure tubes process is controlled through the simple approach of utilizing flow rate controlling hydraulic resistance within coolant injection conduits. Those hydraulic resistances may be implemented with a conventional orifice, the size and shape of which determines desired flow rates or by the throttling of a valve within the injection conduit achieving the equivalent result. Under the process, cross tie conduits and associated cross tie valving otherwise used for recirculation loop selection for coolant injection are not activated, but merely remain in an open condition under the new method and system, necessary a structural member for nuclear reactor pressure tubes modifications are achieved without resort to the complicated system and instrumentation otherwise required for loop selection with a minimum of hardware perturbation, rewiring or repiping.

As another feature, the invention provides a structural member for nuclear reactor pressure tubes having a low pressure coolant injection system for a nuclear power facility of a variety having a boiling water reactor, having a reactor core and normal operating pressure, first and second recirculation loops including respective first and second recirculation pumps and actuable discharge valves, a suppression pool water source, a condensate storage tank, and a safety system responsive to a loss-of-coolant accident to generate a safety output. The system includes first and second low pressure coolant injection pumps having suction inputs and discharge outputs and actuable to pump water. A supply conduit arrangement is provided for coupling the suction inputs of the first and second low pressure coolant injection pumps in fluid flow communication with the suppression pool. First and second coolant injection conduits are provided which are coupled with respective discharge outputs of the first and second low pressure coolant injection pumps and to respective first and second recirculation loops. First and second hydraulic resistance components within respective first and second coolant injection conduits are provided for restricting the flow of water coolant therein to a predetermined fluid rate selected to deliver a predetermined quantity of water coolant to each of the first and second recirculation loops, the flow rates being selected as effective for carrying out the emergency cooling of the reactor core from one coolant injection conduit. A control arrangement is provided which is responsive to the safety output for actuating the first and second low pressure coolant injection pumps.

As another feature, the invention provides a method for injecting low pressure cooling water into the boiling water reactor of a nuclear power facility having a source of emergency core cooling water, first and second independent recirculation loops normally circulating water through the core of the reactor for steam generation and a safety system responsive to a loss-of-coolant accident to generate a safety output for effecting the supply of at least a predetermined quantity of water coolant to the reactor, comprising the steps of:

A) providing first and second water flow paths from the source of water coolant to respective first and second recirculation loops;

B) providing low pressure coolant injection pumps actuable or pumping water from the source through the first and second water flow paths;

C) providing a valve arrangement actuable from a closed to an open condition for effecting flow within the first and second water flow path actuating the valve arrangement in response to the safety output to permit water coolant flow simultaneously in each first and second water flow path; actuating the low pressure coolant injection pumps in response to the safety output; and D) restricting the flow of the water coolant in each first and second water flow path to a predetermined fluid flow rate selected to deliver the predetermined quantity of water coolant to each respective first and second independent recirculation loops, said flow rate being selected as effective for carrying out the emergency cooling of the reactor core from one water flow path.

As another feature, the invention provides a low pressure coolant injection system for a nuclear power facility of a variety having a boiling water reactor with a reactor core, and normal operating pressure, first and second recirculation loops including respective first and second recirculation pumps and actuable discharge valves, a suppression pool water source, a condensate storage tank, and a safety system responsive to a loss-of-coolant accident to generate a safety output. The system includes first and second low pressure coolant injection pumps having suction inputs and discharge outputs and actuable to pump water. A supply conduit arrangement is provided for coupling the suction inputs of the first and second low pressure coolant injection pumps in fluid flow communication with the suppression pool and further includes a cross fie conduit arrangement for selectively interconnecting the discharge outputs of the first and second low pressure coolant injection pumps. First and second coolant injection conduits are provided which are coupled with respective discharge outputs of the first and second low pressure coolant injection pumps and to respective first and second recirculation loops. First and second low pressure coolant injection valves are provided within respective first and second coolant injection conduits and are actuable between closed and open orientations. Further provided are first and second hydraulic resistance devices within respective first and second coolant injection conduits for restricting the flow of water coolant therein to a predetermined fluid rate selected to deliver a predetermined quantity of water to each of the first and second recirculation loops, the flow rate being selected as effective for carrying out the emergency cooling of the reactor core from one coolant injection conduit. A cross tie valve arrangement is provided within the cross tie conduit which is actuable between open and closed conditions for selectively directing the outputs of the first and second low pressure coolant injection pumps to one of the first and second recirculation loops through select first and second coolant injection conduits. A control arrangement is provided which is responsive to the safety output for actuating the first and second low pressure coolant injection pumps, the first and second low pressure coolant injection valves and retaining the cross tie arrangement in the open condition in the presence of the safety output.

The invention, accordingly, comprises the system and method possessing the construction, combination of elements, arrangement of parts and steps which are exemplified in the following description.

Accordingly, it is an object of the present invention to provide a new structural member with metal fuel channel pressure tubes that reduce moment, reaction and deflection stresses at the ends of the metal pressure tubes.

More particularly, it is an object of the present invention to provide a new structural member that will reduce the incidence of cracks developing in the metal of the fuel channel pressure tubes. The new structural members with ceramic fuel channel pressure tubes reduces moment, reaction and deflection stresses at the end of the ceramic pressure tube. The ceramic pressure tube is not affected by irradiation and growth of its diameter as the metal tube is.

In keeping with these objects, and with others which will become apparent hereinafter, one feature of the present invention resides, briefly stated, in the ability to use ceramics instead of metal as the pressure tubes.

When the structural member for nuclear reactor pressure tubes is designed in accordance with the present invention, stress of the pressure tube is greatly reduced, if not eliminated.

In accordance with another feature of the present invention, the invention provides for the use of ceramic pressure tubes by providing full length support without deflection for ceramic brittle material.

Another feature of the present invention is that the new structural member would be made to house four, six or eight, etc. pressure tubes within it. The new structural member would act as a Calandria for all the pressure tubes within. The advantage would be that the new structural member would act as a unit that would nave its own controls as to the flow of gas or heavy water. It could be taken out of service for maintenance or pressure tube replacement, while the reactor would remain in operation.

Yet another feature of the present invention is the support pads which cradle the pressure tubes and prevent sideways movement of the tube.

Accordingly, it is a general object of the present invention to provide the reduction of stresses in Calandria and pressure tubes.

It is a more particular object of the present invention to provide continuous and intermittent support for the pressure tubes.

An object of the present invention is to provide the prevention of cracks in the pressure tubes.

A further object of the present invention is to eliminate deflection and sag in Calandria and pressure tubes.

A still further object of the invention is to provide the use of materials for pressure tubes that withstand irradiation, high temperatures, etc (ceramic).

A further object of the present invention is to allow for replacement of pressure tubes without shutting down the reactor.

Accordingly, it is an object of the present invention to provide the End Plates of glass or metal will be formed with depressions to fit and accept the ends of the Fuel Elements.

More particularly, it is an object of the present invention to provide a Hollow tube to be placed between the End Plates for the length of the fuel bundle. A rod or wire will be threaded through the tube and through a hole in the end plates. After the Fuel Elements will be in place in the End Plates the rod or wire will be reissued and anchored to hold the bundle together.

In keeping with these objects, and with others which will become apparent hereinafter, one feature of the present invention resides, briefly stated, in the end of the tube or rod there will be a spacer plate. The spacer Plate will be in contact with the inside face of the End Plates. The stress of the rod or wire will hold the bundle together, but it will not put stress on the Glass Fuel Elements.

When the fuel bundle is designed in accordance with the present invention, after the bundle is removed from the reactor, the end plates can be separated from the bundle and reused. The Fuel Elements with the spent fuel could be removed and sent to storage.

Still another feature of the present invention is that The End Plate, made of glass or metal will be formed to leave cup-like indentions to fit to accept the ends of the Fuel Elements.

Yet still another feature of the present invention is that The End Plate, made of glass, will be (welded) attached to the Fuel Elements by molten glass.

Still yet another feature of the present invention is that the End Plate holding the fuel elements together will also be made of glass.

Another feature of the present invention is that the Fuel Elements will be assembled into a bundle.

Yet another feature of the present invention is that the Fuel Elements will be made of glass and filled with pellets.

Still another feature of the present invention is that At Each end, a plate is welded to the Fuel Elements, holding them together as a bundle.

Yet still another feature of the present invention is that Approximately Thirty-Seven of the Fuel Elements form a cylindrical Fuel Bundle.

Still yet another feature of the present invention is that the Fuel Pellets are stocked end to end inside the cylindrical Fuel Element container and sealed.

Another feature of the present invention is that the Fuel element is a metal Fuel Sheathing, a cylinder of approximately twenty inch length and 5/8 inch diameter.

Yet another feature of the present invention is that Cylindrical Fuel pellets approximately 3/4 inches long and 1/2 inch in diameter.

Still another feature of the present invention is that The Fuel Bundle is approximately twenty inches long and 4 5/8 inches in diameter.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF LIST OF REFERENCE NUMERALS UTILIZED IN THE DRAWING

10—miniaturized nuclear reactor utilizing improved pressure robe structural members 10
12—calandria tube 12
12A—calandria robe coating 12A
12B—calandria robe lining 12B
12C—calandria robe cladding 12C
14—fuel channel pressure tube 14
14A—fuel channel pressure tube coating 14A
14B—fuel channel pressure robe lining 14B
14C—fuel channel pressure tube cladding 14C
16—fuel bundle support pad 16
16A—fuel bundle support pad spacer 16A
16B—fuel bundle support pad strap 16B
17—fuel compartment pressure robe 17
18—fuel channel pressure tube pad 18
18A—fuel channel pressure tube pad vertical spacer 18A
18B—fuel channel pressure tube pad end 18B
18C—fuel channel pressure robe pad horizontal spacer 18C
20—moderator 20
22—horizontal interior support pad 22
22A—horizontal interior support pad proximal end 22A
22B—horizontal interior support pad distal end 22B
22C—horizontal interior support pad groove 22C
22D—horizontal interior support pad concave 22D
22E—horizontal interior support pad coating 22E
22F—horizontal interior support pad lining 22F
22G—horizontal interior support pad cladding 22G
24—vertical support pad 24
24A—vertical support pad proximal end 24A
24B—vertical support pad distal end 24B
24C—vertical support pad grove 24C
24D—vertical support pad concave 24D
26—fuel bundle 26
28—angular support pad 28
28A—angular support pad top member 28A
28B—angular support pad bottom member 28B
30—horizontal exterior support pad 30
30A—horizontal exterior support pad end 30A
30B—horizontal exterior support pad fastener 30B
30C—horizontal exterior support pad concave 30C
40—fuel bundle 40
40AA—first fuel bundle proximal end plate 40AA
40AAA—first fuel bundle proximal end plate fuel element end fastener 40AAA
40AAB—first fuel bundle proximal end plate port 40AAB
40AAC—first fuel bundle proximal end plate indent 40AAC
40AAD—first fuel bundle proximal end plate opening 40AAD
40BA—second fuel bundle distal end plate 40BA
40BAA—second fuel bundle distal end plate fuel element end fastener 40BAA
40BAB—second fuel bundle distal end plate port 40BAB
40BAC—second fuel bundle distal end plate indent 40BAC
40BAD—second fuel bundle distal end plate opening 40BAD
40C—fuel element 40C
40D—fuel bundle support 40D
40DA—fuel bundle support proximal end 40DA
40DB—fuel bundle support proximal end spacer 40DB
40DC—fuel bundle support distal end 40DC
40DD—fuel bundle support distal end spacer 40DD
40DE—fuel bundle support spacer tube 40DE
40DF—fuel bundle support rod 40DF
40DG—fuel bundle support nut 40DG
42—reactor wall 42
44—reactor wall interior horizontal 44
46—reactor wall interior vertical 46
48—joint connector 48
48A—joint connector 48A
50—joiner ring 50
50A—joiner ring thread 50
52—service tube 52
SECOND EMBODIMENT
112—second calandria tube 112
112A—second calandria tube compartments 112A
113—second fuel channel pressure tube support pad 113
113A—second fuel channel pressure tube support pad end 113A
113B—second fuel channel pressure tube support pad spacer 113B
113C—second fuel channel pressure tube support pad concave 113C
113D—second fuel channel pressure tube support pad convex 113D
113E—second fuel channel pressure tube support pad groove 113E
113F—second fuel channel pressure tube support pad opening 113F
114—second fuel channel pressure tube 114
114A—second fuel channel pressure tube compartment 114A

BRIEF DESCRIPTION OF THE PREFERRED EMBODIMENT

FIG. 2A is a front view of the a miniaturized nuclear reactor utilizing improved pressure tube structural members.

FIG. 2B is an enlarged perspective view of a horizontal interior support pad positioned on a reactor wall interior horizontal.

FIG. 2C is an enlarged front view of an angular support pad affixed to a reactor wall.

FIG. 2D is an enlarged front view of a vertical support pad positioned in the reactor wall interior vertical.

FIG. 2E is an enlarged front view of a horizontal exterior support pad affixed upon the reactor wall interior horizontal.

FIG. 3 is an enlarged front upper left view miniaturized nuclear reactor utilizing improved fuel channel pressure tube structural member, the fuel bundle rests atop of the fuel bundle support pad which rests upon the fuel channel pressure tube which in turn rests atop of the fuel channel support pad which rests atop of the calandria tube which rests atop of the calandria support pad.

FIG. 4 is a front view of a second embodiment fuel channel pressure tube.

FIG. 4A is a front view of a second embodiment calandria tubes joined together by a fuel compartment pressure tube.

FIG. 5 is a perspective view of a second embodiment fuel channel pressure tube support pad.

FIG. 5A is a cross-sectional view of a fuel channel pressure tube support pad.

FIG. 6 is a perspective view of a fuel bundle.

FIG. 6A is an unassembled perspective view of a fuel bundle.

FIG. 6B is a perspective view of a first fuel bundle end plate.

FIG. 6C is a perspective view of a fuel bundle support.

FIG. 6D is a cross-sectional view of a first fuel bundle end plate.

FIG. 6E is a cross-sectional view of a second fuel bundle end plate.

FIG. 7 is a cross-sectional view of a fuel channel pressure tube having coating, lining and cladding of the surfaces.

FIG. 8 is a cross-sectional view of a calandria tube having coating, lining and cladding of the surfaces.

FIG. 9 is a cross-sectional view of a horizontal interior support pad having coating, lining and cladding of the surfaces.

FIG. 10 is a cross-sectional view of a refueling of a miniaturized reactor. The fuel channel pressure tube has a joint connection at the end walls of the reactor for refilling.

FIG. 17 is a cross sectional view of the new structural members with various detail showing four pressure tube structure with support details.

FIG. 17A is a detail view of the center wall horizontal support inside of the cross sectional view of the new structural members with four pressure tube structure.

FIG. 17B is a detail view of the center wall vertical support inside of the cross sectional view of the new structural members with four pressure tube structure.

FIG. 17C is a detail view of the center wall corner support inside of the cross sectional view of the new structural members with four pressure tube structure.

FIG. 17D is a detail view of the center wall bottom support inside of the cross sectional view of the new structural members with four pressure tube structure.

DETAILED DESCRIPTION OF THE PREFERRED EMBODIMENT

Figure 1:
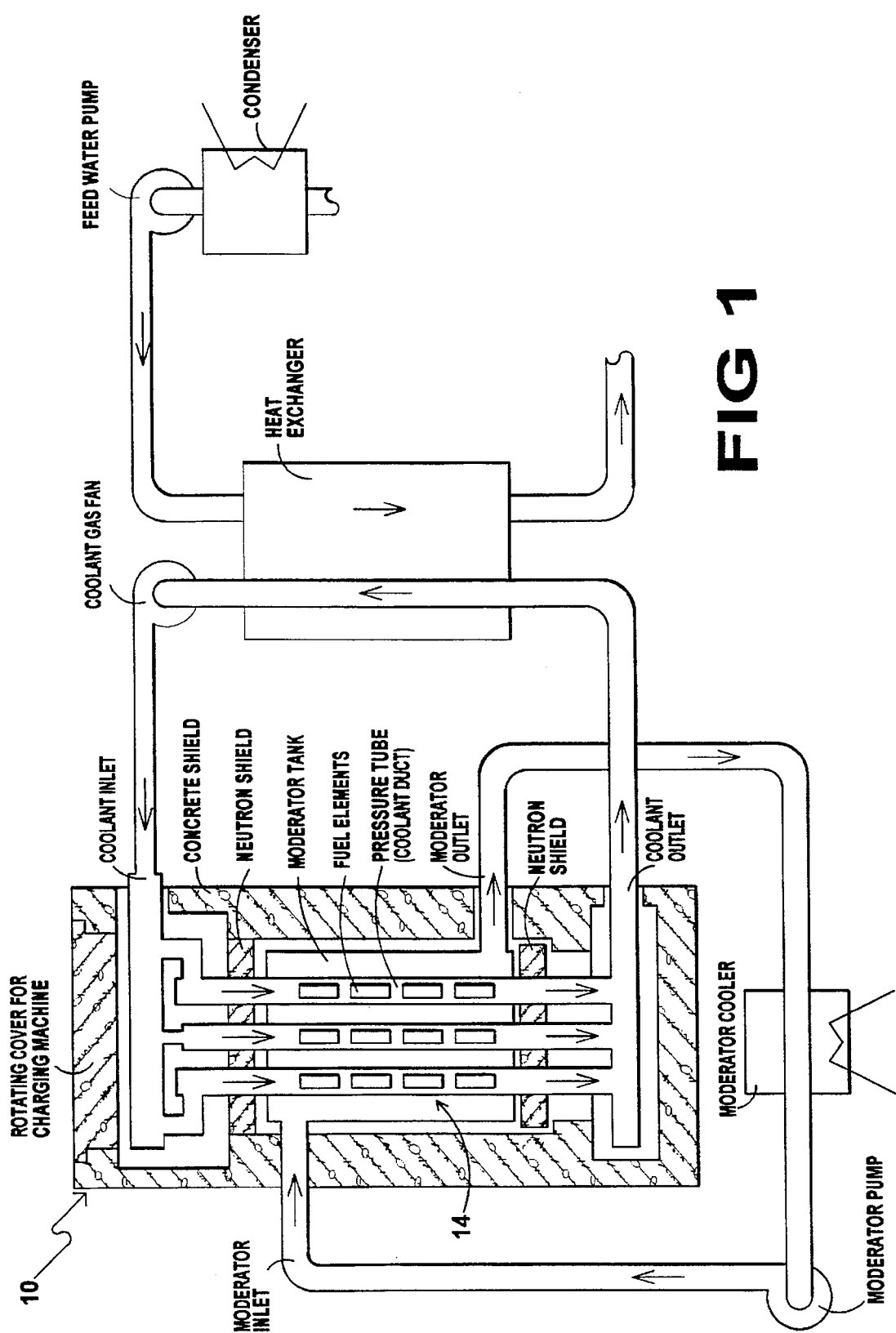
FIG. 1 is a diagrammatic view of a miniaturized nuclear reactor utilizing improved pressure tube structural members.

Firstly, referring to FIG. 1 which is a diagrammatic view of a miniaturized nuclear reactor 10 utilizing improved fuel channel pressure tube 14 structural members. The entire miniaturized nuclear reactor 10 is composed of a moderator tank having a moderator inlet and a moderator outlet. The fluid contained within the moderator is circulated throughout the moderator tank by the moderator pump and is cooled in the moderator cooler. An additional coolant system to extract heat from and cool the fuel pressure channel tubes through a coolant duct system is composed of a coolant inlet, coolant outlet having a coolant gas fan. The coolant passes through a heat exchanger which has its own closed heat extraction system utilizing a feed water pump to circulate fluid throughout. The heat exchanger extracts the heat from the coolant utilizing the energy to propel a turbine which generates electricity from a generator. Within the heat exchanger system a condenser is positioned. The heat extracted from this system can heat apartment buildings and/or office buildings and/or green houses as well as generate electricity.

Figure 2:
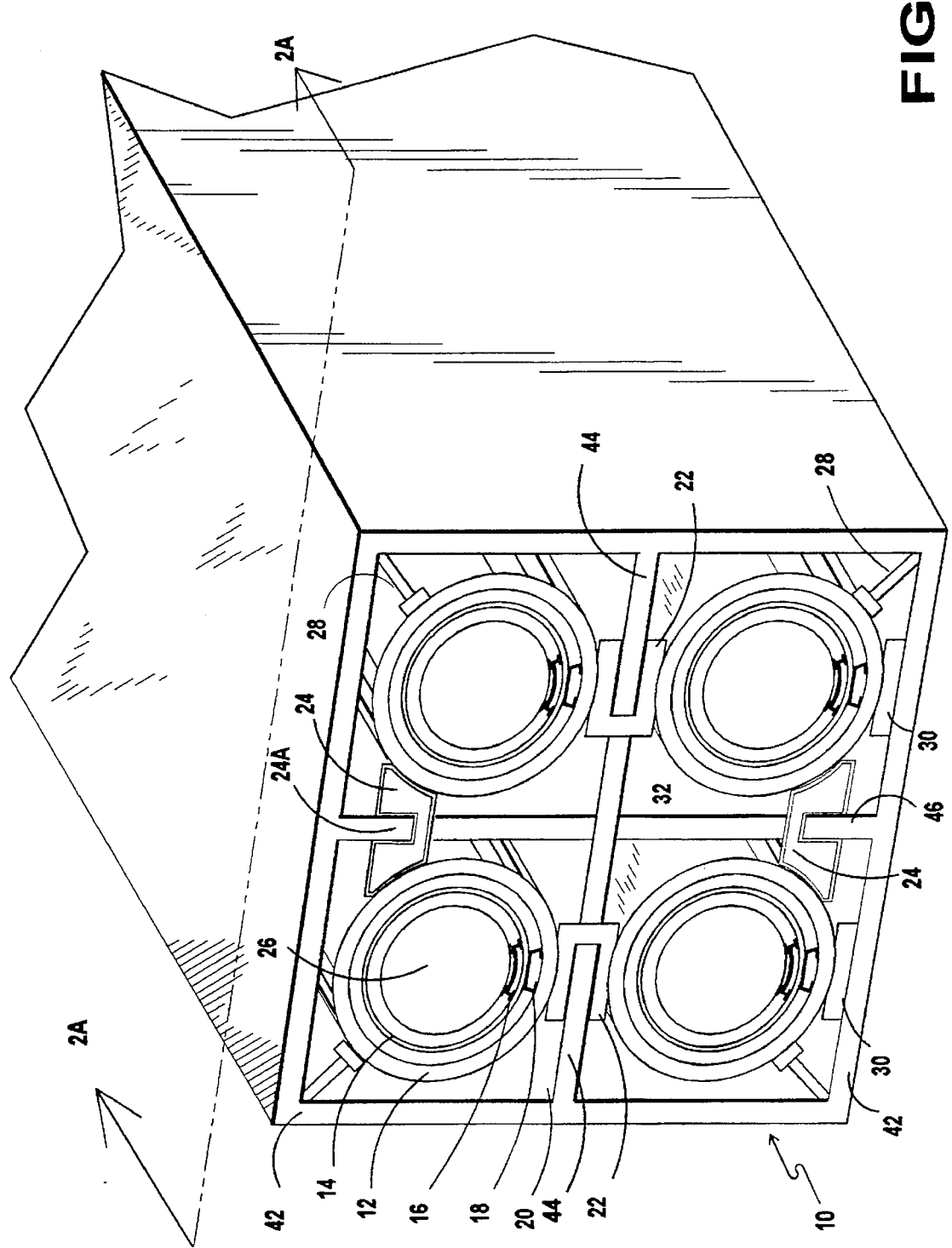
FIG. 2 is a end perspective view of a miniaturized nuclear reactor utilizing improved pressure tube structural member.
Figure 11:
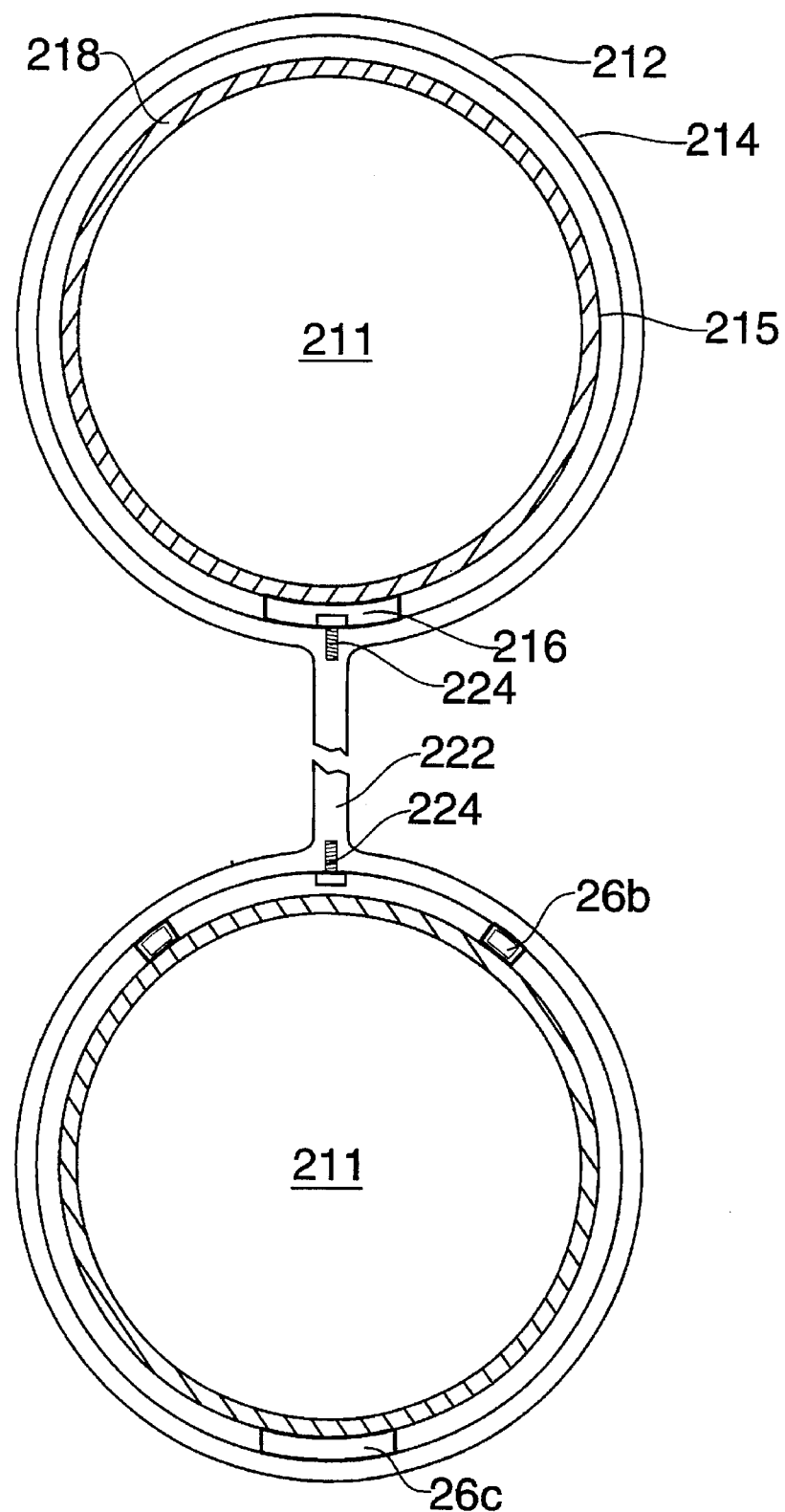
FIG. 11 is a cross sectional view of the new structural member and pressure tubes.
Figure 12:
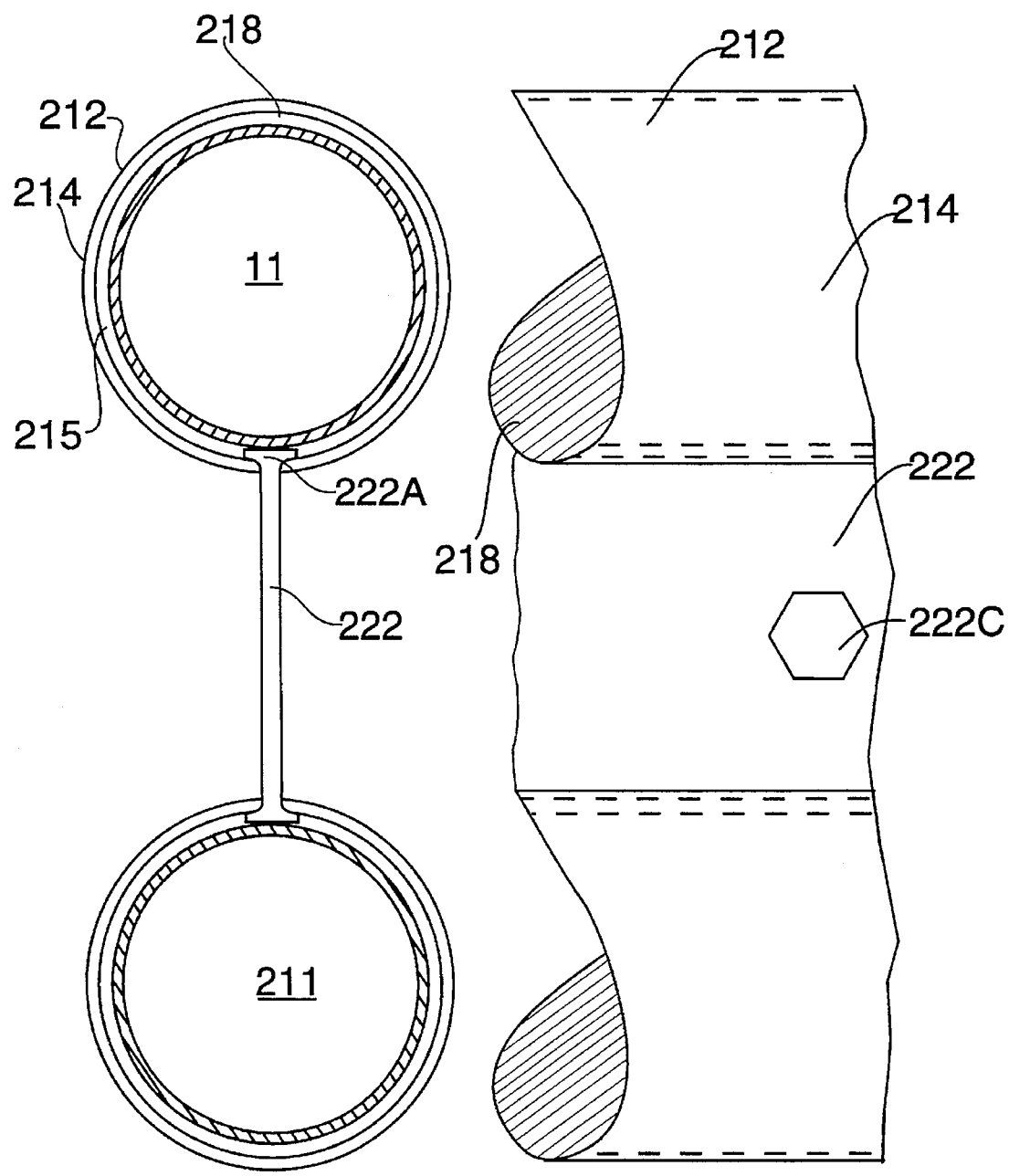
FIG. 12 is a cross sectional view of the new structural member and pressure lubes along with a side view of the pressure tubes and web.
Figure 13:
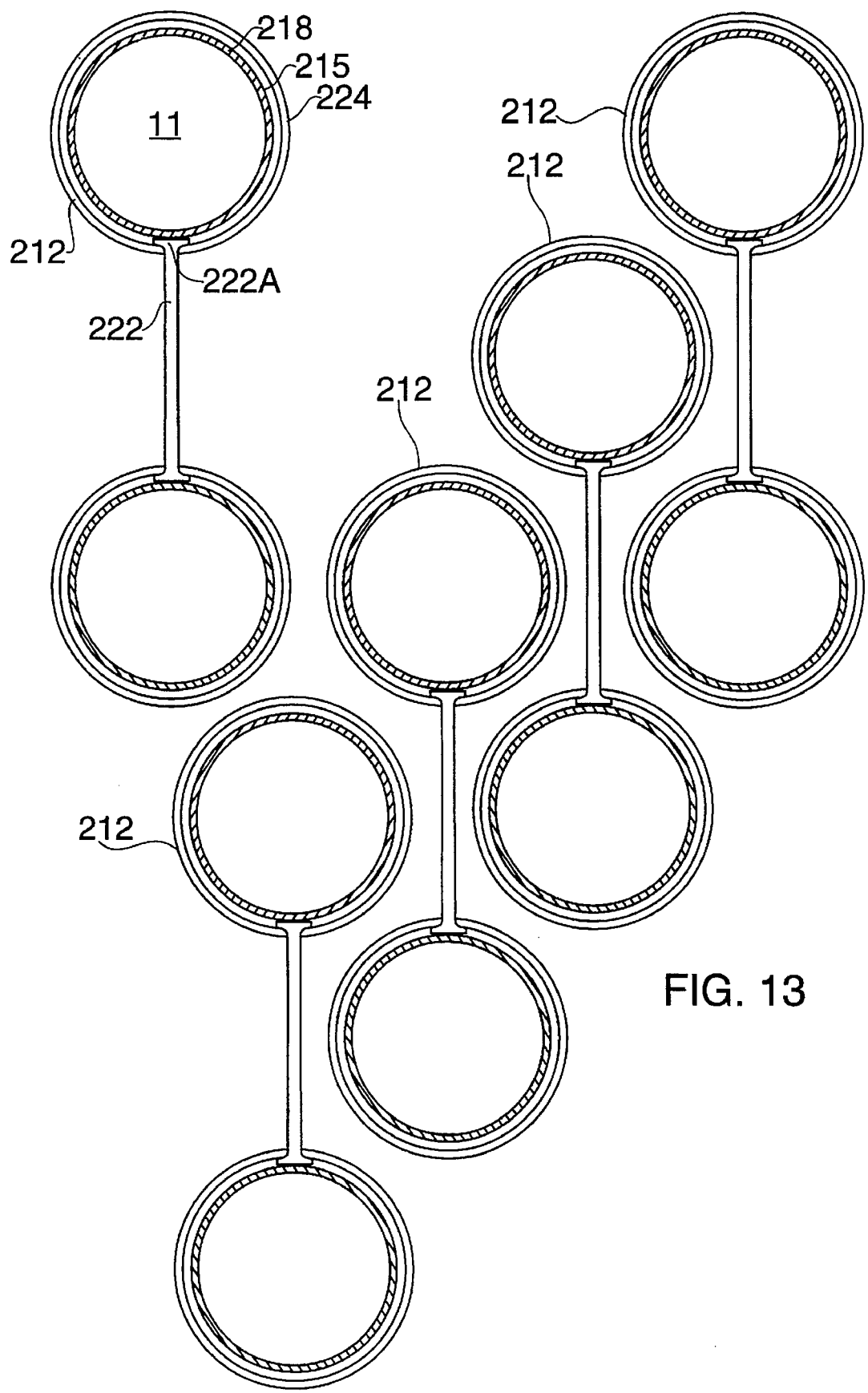
FIG. 13 is a cross sectional view of the new structural members inside of the nuclear reactor.
Figure 14:
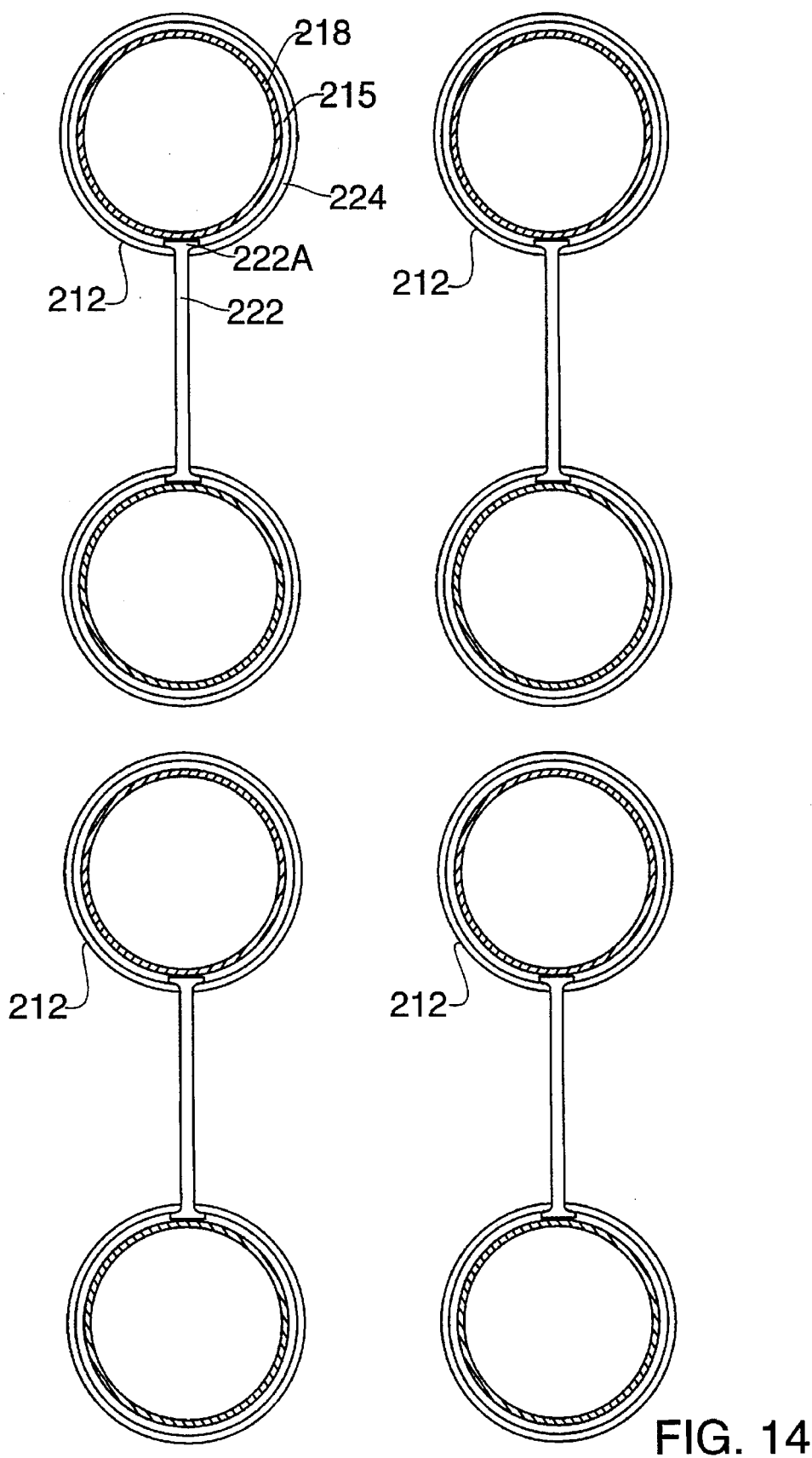
FIG. 14 is a second cross sectional view of the new structural members inside of the nuclear reactor.
Figure 15:
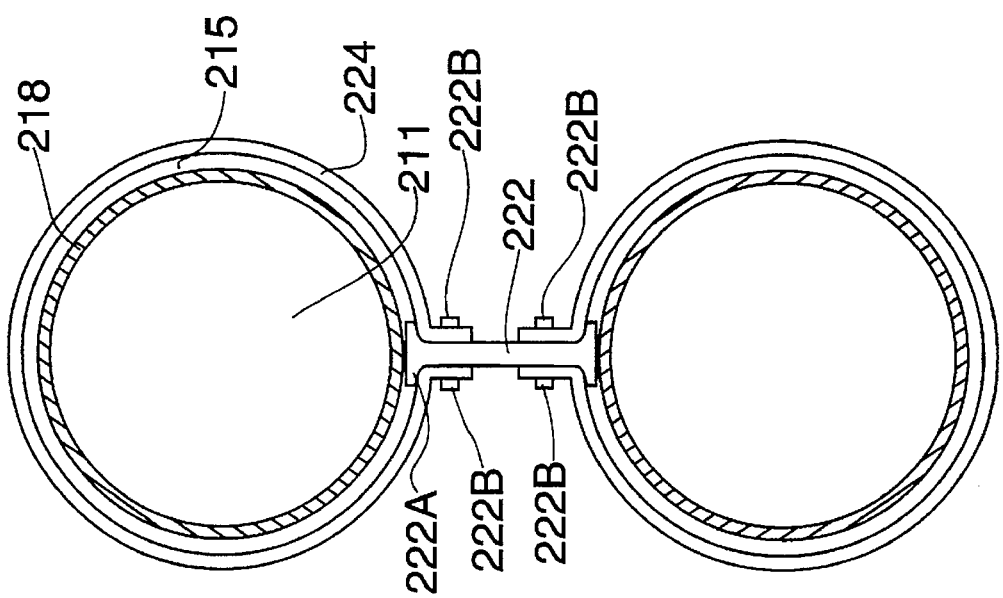
FIG. 15 is a cross sectional view of the new structural member and pressure tubes showing the side bolts.
Figure 16:
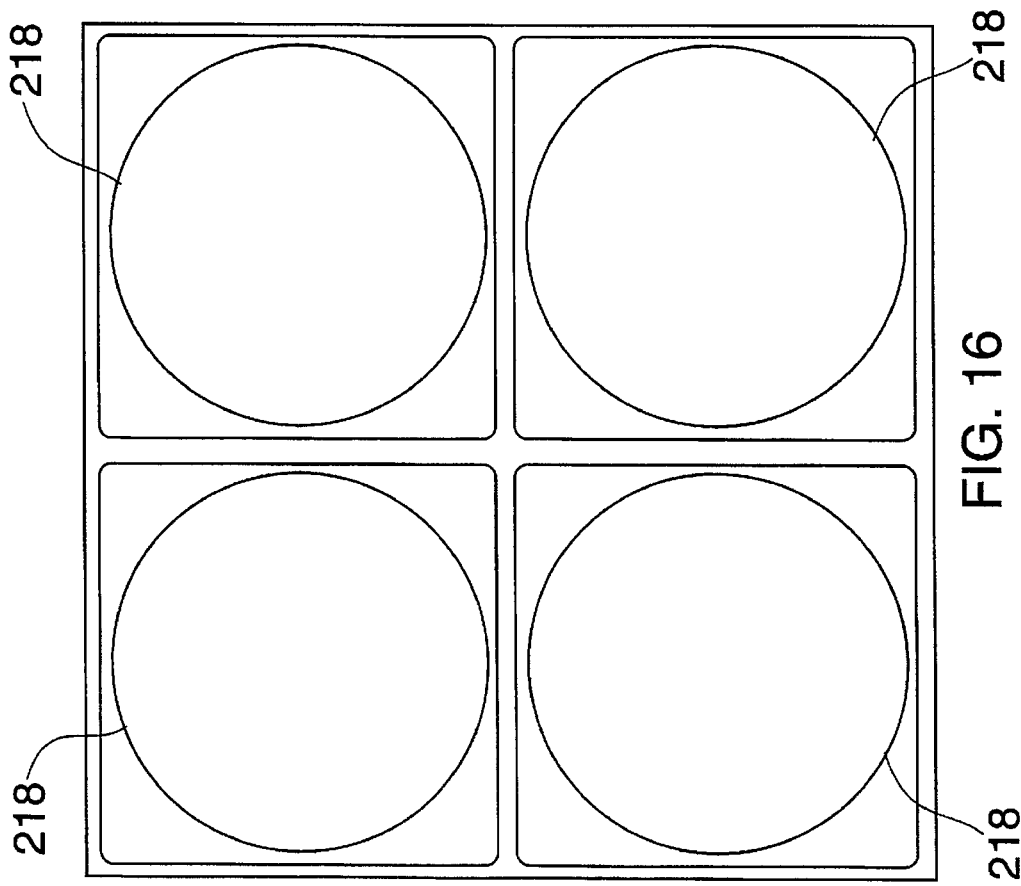
FIG. 16 is a cross sectional view of the new structural members showing four pressure tube structure.

Secondly, referring to FIG. 2 which is a end perspective view of a miniaturized nuclear reactor 10 utilizing improved fuel channel pressure tube 14 structural member. The calandria tubes 12 are contained within the moderator 20. The miniaturized nuclear reactor 10 has exterior reactor walls 42 with a matrix of interior partitioning walls: the reactor wall interior horizontal 44 and the reactor wall interior vertical 46. Although in the drawing there only shows four moderator 20 compartments, there may be lesser or more moderator compartments 20 by utilizing additional reactor wall interior horizontal 44 and reactor wall interior vertical 46. The calandria tubes 12 are supported within the moderator 20 on the bottom by horizontal interior support pad 22 which is integrally positioned approximately mid-distance within and extending lengthwise throughout the reactor wall interior horizontal 44. The calandria tubes are supported within the moderator 20 on an inner side by a vertical support pad 24 which is integrally positioned approximately mid-distance within and extending lengthwise throughout the reactor wall interior vertical 46. The calandria tubes are supported within the moderator 20 on an angular inner side by a angular support pad 28 which is integrally positioned within extending lengthwise throughout the corner formed between throughout top and bottom of the reactor walls 42. Within the calandria tube 12, a fuel channel pressure tube support 18 is positioned at the bottom upon which the fuel channel pressure tube 14 rests. At a bottom position within the fuel channel pressure tube 14, a fuel bundle support pad 16 is situated upon which rests the fuel bundle 26.

Now referring to FIG. 2A which is a front view of the a miniaturized nuclear reactor 10 utilizing improved pressure tube 14 structural members. The calandria tubes 12 are contained within the moderator 20. The miniaturized nuclear reactor 10 has exterior reactor walls 42 with a matrix of interior partitioning walls: the reactor wall interior horizontal 44 and the reactor wall interior vertical 46. Although in the drawing there only shows four moderator 20 compartments, there may be lesser or more moderator compartments 20 by utilizing additional reactor wall interior horizontal 44 and reactor wall interior vertical 46. The calandria tubes 12 are supported within the moderator 20 on the bottom by horizontal interior support pad 22 which is integrally positioned approximately mid-distance within and extending lengthwise throughout the reactor wall interior horizontal 44. The calandria tubes are supported within the moderator 20 on an inner side by a vertical support pad 24 which is integrally positioned approximately mid-distance within and extending lengthwise throughout the reactor wall interior vertical 46. The calandria tubes 14 are supported within the moderator 20 on an angular inner side by a angular support pad 28 which is integrally positioned within extending lengthwise throughout the corner formed between throughout top and bottom of the reactor walls 42.

Now referring to FIG. 2B which is an enlarged perspective view of a horizontal interior support pad 22 positioned on reactor wall interior horizontal 44. By resting atop of the horizontal interior support pad 22 on the horizontal interior support pad concave 22D, it holds an upper calandria tube 12 in place as well as holding a lower calandria tube 12 in place at its top by positioning in the upper convex surface of the calandria tube into the horizontal interior support pad concave 22D. The horizontal interior support pad 22 is positioned approximately mid-distance and extends throughout in an interspersed lengthwise fashion of the reactor wall interior horizontal 44. The horizontal interior support pad 22 comprises: horizontal interior support pad proximal end 22A; horizontal interior support pad distal end 22B; horizontal interior support pad groove 22C; and horizontal interior support pad concave 22D. The horizontal interior support pad proximal end 22A is flat and abuts an inner segment of the reactor wall interior horizontal 44. There are two horizontal interior support pad distal ends 22B forming a horizontal interior support pad groove 22C therebetween.

Referring to FIG. 2C which is an enlarged front view of an angular support pad 28 affixed to a reactor wall 42. The calandria tubes are supported within the moderator 20 on an angular inner side by a angular support pad 28 which is integrally positioned within extending lengthwise throughout the corner formed between throughout top and bottom of the reactor walls 42. The angular support pad 28 comprises: angular support pad top member 28A and angular support pad bottom member 28B. The angular support pad top member 28A abuts the calandria tube 12 and the angular support pad bottom member 28B is securely affixed within the corner formed between throughout top and bottom of the reactor walls 42.

Referring now to FIG. 2D which is an enlarged front view of a vertical support pad 24 positioned in the reactor wall interior vertical 46. By resting on a side of the a vertical support pad 24 on the vertical support pad concave 24D, it holds left calandria tube 12 in place as well as holding a right calandria tube 12 in place at its top by positioning in the upper convex surface of the calandria tube 12 into the vertical support pad concave 24D located on both sides of the vertical support pad 24. The vertical support pad 24 is positioned approximately mid-distance and extends throughout in an interspersed lengthwise fashion of the reactor wall interior vertical 46. The vertical support pad 24 comprises: a vertical support pad proximal end 24A; vertical support pad distal end 24B; and vertical support pad groove 24C.

The vertical support pad proximal end 24A is flat and abuts an inner segment of the reactor wall interior vertical 46. There are vertical support pad distal end 24B forming a horizontal interior support pad groove 22C therebetween. The horizontal interior support pad groove 22C wraps around an exterior segment of the reactor wall interior vertical 46.

Now referring to FIG. 3 is an enlarged front view of a horizontal exterior support pad 30 affixed upon the bottom interior surface of the reactor wall 42. The horizontal exterior support pad 30 comprises: a horizontal exterior support pad end 30A; a horizontal exterior support pad fastener 30; and a horizontal exterior support pad concave 30C. The calandria tube 12 rests atop of the horizontal exterior support pad 30 within the horizontal exterior support pad concave 30C. The horizontal exterior support pad 30 extends at an approximate mid-position throughout in a lengthwise configuration throughout the moderator 20.

Now referring to FIG. 2E is an enlarged front upper left view of a miniaturized nuclear reactor 10 utilizing improved pressure tube 14 structural member, the fuel bundle 40 rests atop of the fuel bundle support pad 16 which rests upon the fuel channel pressure tube 14 which in turn rests atop of the fuel channel pressure tube support pad 18 which rests atop of the calandria tube 12 which rests atop of the calandria support pad 12. The fuel bundle support pad 16 forming a bridge-like support upon which the fuel bundle 40 rests comprises a pair of fuel bundle support pad spacers 16A which are positioned at distal ends of a fuel bundle support pad strap 16B. The fuel channel pressure tube support pad 18 comprises: fuel channel pressure tube pad vertical spacer 18A; fuel channel pressure tube pad end 18B and fuel channel pressure tube pad horizontal spacer 18C. The fuel channel pressure tube pad end 18B is positioned at an obtuse angle to the fuel channel pressure tube pad vertical spacer 18A in order to conform m the interior curvature of the calandria tube 12. The fuel channel pressure tube support pad 18 may extend throughout the length of the calandria tube 12.

Referring now to FIG. 4 which is a front view of a second embodiment fuel channel pressure tube 114 exhibiting a plurality of second fuel channel pressure tube compartments 114A arranged around the exterior periphery of the second fuel channel pressure tube 114. The second embodiment second embodiment fuel channel pressure tubes 114 are inserted within the second calandria tube 112. The plurality of second fuel channel pressure tube compartments 114A interlock into the opposingly configured second calandria tube compartments 112A which are positioned about an interior periphery of the second calandria tube 112.

Referring to FIG. 4A which is a front view of a second calandria tube 12. There are second calandria tube compartments 12A positioned about an interior periphery of the second calandria tube 12 in and throughout which the second fuel channel pressure tube compartments 14A slide within.

Now referring to FIG. 5 and FIG. 5A which are a perspective view and a cross-sectional view of a second fuel channel pressure tube support pad 113 comprising: second fuel channel pressure tube support pad end 113A; second fuel channel pressure tube support pad spacer 113B; second fuel channel pressure tube support pad concave 113C;

second fuel channel pressure tube support pad convex 113D; and second fuel channel pressure tube support pad groove 113E. The second fuel channel pressure tube support pad 113 functions to support the fuel channel pressure tube 14 and extends full length and attach to the calandria tube 12 at each end. It is important that the pads are affixed in place. The second fuel channel pressure tube support pad concave 113C and the second fuel channel pressure tube support pad convex 113D have a second fuel channel pressure tube support pad spacer which functions as a spacer therebetween forming second fuel channel pressure tube support pad openings 113F. The second fuel channel pressure tube support pad 113 is interspersed throughout its length with The second fuel channel pressure tube support pad grooves 113E. The second fuel channel pressure tube support pad groove 113E and the second fuel channel pressure tube support pad openings 113F function for circulation of fluid.

Referring now to FIG. 6 and FIG. 6A which is a perspective view of an assembled and unassembled, respectively, of a fuel bundle 40 comprising: first fuel bundle proximal end plate 40AA; first fuel bundle proximal end plate fuel element end fastener 40AAA; first fuel bundle proximal end plate port 40AAB; first fuel bundle proximal end plate indent 40AAC; first fuel bundle proximal end plate opening 40AAD; second fuel bundle distal end plate 40BA; second fuel bundle distal end plate fuel element end fastener 40BAA; second fuel bundle distal end plate port 40BAB; second fuel bundle distal end plate indent 40BAC; second fuel bundle distal end plate opening 40BAD; fuel element 40C; fuel bundle support 40D; fuel bundle support proximal end 40DA; fuel bundle support proximal end spacer 40DB; fuel bundle support distal end 40DC; fuel bundle support distal end spacer 40DD; fuel bundle support spacer tube 40DE; and fuel bundle support rod 40DF.

The second fuel bundle distal end plate 40BA has a plurality of second fuel bundle distal end plate fuel element end fastener 40BAA which affix a second distal end of fuel elements 40C. The second fuel bundle distal end plate 40BA has a plurality of second fuel bundle distal end plate port 40BAB interspersed throughout and between the second fuel bundle distal end plate fuel element end fasteners 40BAA. The second fuel bundle distal end plate indent 40BAC functions to accept the fuel bundle support nut 40DG therein. The second fuel bundle distal end plate opening 40BAD accepts the fuel bundle support distal end 40DC therethrough.

The fuel bundle support 40D has a fuel bundle support proximal end 40DA which passes through first fuel bundle proximal end plate opening 40AAD being secured by fuel bundle support nut 40DG. The fuel bundle support proximal end spacer 40DB functions to form a space between the fuel bundle support 40D and the first fuel bundle proximal end plate 40AA. The fuel bundle support distal end 40DC passes through second fuel bundle proximal end plate opening 40BAD being secured by fuel bundle support nut 40DG. The fuel bundle support distal end spacer 40DD functions to form a space between the fuel bundle support 40D and the second fuel bundle proximal end plate 40BA.

Now referring to FIG. 6B which is a perspective view of a first fuel bundle end plate 40AA. Observe the plurality of first fuel bundle proximal end plate ports 40AAB interspersed throughout which function to increase circulation of fluid throughout the fuel bundle 40. The first fuel bundle proximal end plate indent 40AAC is positioned on an exterior of the first fuel bundle proximal end plate opening 40AAD. The first fuel bundle proximal end plate indent 40AAC functions to accept the fuel bundle support nut 40DG therein. The first fuel bundle proximal end plate opening 40AAD accepts the fuel bundle support distal end 40DC therethrough.

Referring to FIG. 6C which is a perspective view of a fuel bundle support 40D. The fuel bundle support 40D is composed of a fuel bundle support spacer tube 40DE surrounding and encasing a fuel bundle support rod 40DF. The function of this configuration is to increase strength, heating and cooling characteristics.

Referring to FIG. 6D which is a cross-sectional view of a first fuel bundle end plate 40AA. Notice how the first fuel bundle proximal end plate 40AA comprises a plurality of first fuel bundle proximal end plate fuel element end fasteners 40AAA which affix to a first distal end of a fuel element 40C. The first fuel bundle proximal end plate 40AA has multiple first fuel bundle proximal end plate ports 40AAB throughout which function to increase circulation of fluid throughout the fuel bundle 40. The first fuel bundle proximal end plate indent 40AAC is positioned on an exterior of the first fuel bundle proximal end plate opening 40AAD. The first fuel bundle proximal end plate indent 40AAC functions to accept the fuel bundle support nut 40DG therein. The first fuel bundle proximal end plate opening 40AAD accepts the fuel bundle support distal end 40DC therethrough.

Referring to FIG. 6E which is a cross-sectional view of a second fuel bundle end plate 40BA. The second fuel bundle distal end plate 40BA has a plurality of second fuel bundle distal end plate fuel element end fastener 40BAA which affix a second distal end of fuel elements 40C. The second fuel bundle distal end plate indent 40BAG functions to accept the fuel bundle support nut 40DG therein. The second fuel bundle distal end plate opening 40BAD accepts the fuel bundle support distal end 40DC therethrough.

Referring now to FIG. 7 which is a cross-sectional view of a fuel channel pressure tube 14 having fuel channel pressure tube coating 14A; fuel channel pressure tube lining 14B; and fuel channel pressure tube cladding 14C which function to resist abrasion and increase inherent overall strength of the fuel channel pressure tube 14.

Referring to FIG. 8 which is a cross-sectional view of a calandria tube having coating, lining and cladding of the surfaces having calandria tube coating 12A; calandria tube lining 12B; and calandria tube cladding 12C which function to resist abrasion and increase inherent overall strength of the calandria tube 12.

Referring to FIG. 9 is a cross-sectional view of a horizontal interior support pad 22 having horizontal interior support pad coating 22E, horizontal interior support pad lining 22F and horizontal interior support pad cladding 22G of the surfaces.

Lastly, referring to FIG. 10 which is a cross-sectional view of a refueling of a miniaturized reactor 10. The fuel channel pressure tube 14 has a joint connection at the end walls of the reactor for refilling. The joint connection is comprised of a joiner 48 having joiner thread 48A which screws into closure ring thread 50A being affixed to closure ring 50. The closure ring 50 is affixed to service tube 52 which is connected to the fluids which circulate through the reactor 10.

It will be understood that each of the elements described above, or two or more together, may also find a useful application in other types of constructions differing from the type described above.

While the invention has been illustrated and described as embodied in a structural member for nuclear reactor pressure tubes, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A miniaturized nuclear reactor utilizing improved pressure tube structural member comprising:
   a) a moderator (20) having: a top reactor wall, a bottom reactor wall, a reactor front wall, a reactor back wall, and two reactor side walls;
   b) at least one calandria tube (12) contained within the moderator (20);
   c) at least one fuel channel pressure tube (14) contained within the at least one calandria tube (12), the fuel channel pressure tube (14) further comprises: a fuel channel pressure tube coating (14A), the at least one fuel channel pressure tube (14) further comprises a fuel channel pressure tube lining (14B) and a fuel channel pressure tube cladding (14C);
   d) at least one fuel bundle (26) contained within the at least one fuel channel pressure tube (14);
   e) at least one fuel channel pressure tube pad (18) positioned between the at least one calandria tube (12) and the at least one fuel channel pressure tube (14), the fuel channel pressure tube pad (18) further comprises a pair of fuel channel pressure tube pad vertical spacers (18A) which are at an obtuse angle to each of a pair of fuel channel pressure tube pad ends (18B), the fuel channel pressure tube pad (18) further comprises a fuel channel pressure tube pad horizontal spacer (18C) connected at opposite distal ends to each one of the fuel channel pressure tube pad vertical spacers (18A);
   f) at least one horizontal exterior support pad (30) positioned on the bottom reactor wall, the at least one horizontal exterior support pad (30) is positioned between the at least one calandria tube (12) and the bottom reactor wall;
   g) at least one fuel bundle support pad (16) positioned between the at least one fuel bundle (26) and the at least one fuel channel pressure tube (14);
   h) at least one vertical support pad (24) positioned on a reactor side wall between the at least one calandria tube (12) and the reactor side wall;
   I) at least one angular support pad (28) positioned on a corner formed between the reactor top wall and the reactor side wall, the at least one angular support pad (28) extending angularly from the corner, the at least one angular support pad functioning to maintain a space between the at least one calandria tube (12) and the reactor top and side walls;
   j) at least one moderator system comprises: at least one moderator inlet, at least one moderator outlet, at least one moderator pump, and at least one moderator cooler;
   k) at least one coolant system which comprises: at least one coolant inlet, at least one coolant outlet, and at least one coolant gas fan;
   l) at least one heat exchanger system which comprises: at least one inlet, at least one outlet, at least one turbine, at least one generator, at least one condenser, and at least one feed water pump.

2. The miniaturized nuclear reactor utilizing improved pressure tube structural members as described in claim 1, wherein the moderator (20) further comprises:
   a) a moderator (20) having: a top reactor wall, a bottom reactor wall, a reactor front wall, a reactor back wall, two reactor side walls, and a reactor horizontal interior wall;
   b) a pair of calandria tubes (12) which comprise an upper calandria tube and a lower calandria tube contained within the moderator (20);
   c) a pair of fuel channel pressure tubes (14) which comprise an upper fuel channel pressure tube contained within the upper calandria tube and a lower channel pressure tube contained within the lower calandria tube;
   d) a pair of fuel bundles (26) which comprise an upper fuel bundle contained within the upper fuel channel pressure tube and a lower fuel bundle contained within the lower fuel channel pressure tube;
   e) at least two fuel channel pressure tube pads (18) which comprise an upper fuel channel pressure tube pad positioned between the upper calandria tube and the upper fuel channel pressure tube and a lower fuel channel pressure tube pad positioned between the lower calandria tube and the lower fuel channel pressure tube;
   f) at least one horizontal exterior support pad (30) positioned on the bottom reactor wall, the at least one horizontal exterior support pad (30) is positioned between the lower calandria tube and the bottom reactor wall;
   g) at least two fuel bundle support pads (16) which comprise an upper fuel bundle support pad positioned between the upper fuel bundle and the upper fuel channel pressure tube and a lower fuel bundle support pad positioned between the lower fuel bundle and the lower fuel channel pressure tube;
   h) at least two vertical support pads (24) which comprise an upper vertical support pad positioned on an upper reactor side wall between the upper calandria tube and the upper reactor side wall and a lower vertical support pad positioned on a lower reactor side wall between the lower calandria tube and the lower reactor side wall;
   I) at least two angular support pads (28) which comprise an upper angular support pad positioned on a corner formed between the reactor top wall and the reactor side wall the upper angular support pad extending angularly from the corner and a lower angular support pad positioned on a corner formed between the reactor bottom wall and the reactor side wall, the lower angular support pad extending angularly from the corner, the upper angular support pad functioning to maintain a space between the upper calandria tube and the reactor top and side walls, the lower angular support pad functioning to maintain a space between the lower calandria tube and the reactor bottom and side walls;
   j) at least one horizontal interior support pad (22) positioned between an upper calandria tube and the at least one reactor horizontal interior wall;
   k) at least one moderator system comprises: at least one moderator inlet, at least one moderator outlet, at least one moderator pump, and at least one moderator cooler;

l) at least one coolant system which comprises: at least one coolant inlet, at least one coolant outlet, and at least one coolant gas fan; and m) at least one heat exchanger system which comprises: at least one inlet, at least one outlet, at least one turbine, at least one generator, at least one condenser, and at least one feed water pump.

3. The miniaturized nuclear reactor utilizing improved pressure tube structural members as described in claim 1, wherein the calandria tube (12) further comprises: a calandria tube coating (12A); a calandria tube lining (12B); and a calandria tube cladding 12C.

4. The miniaturized nuclear reactor utilizing improved pressure tube structural members as described in claim 1, wherein the fuel bundle (16) further comprises a pair of fuel bundle support pad spacers (16A) positioned at opposite distal ends of a fuel bundle support pad strap (16B).

5. The miniaturized nuclear reactor utilizing improved pressure tube structural members as described in claim 1, wherein the at least one fuel bundle (26) is manufactured from glass.

6. The miniaturized nuclear reactor utilizing improved pressure tube structural members as described in claim 2, wherein the horizontal interior support pad further comprises: a horizontal interior support pad proximal end (22A), a horizontal interior support pad distal end (22B), a horizontal interior support pad groove (22C), and a horizontal interior support pad concave (22D), the horizontal interior support pad groove (22C) fitting snugly around a reactor horizontal interior wall, the horizontal interior support pad concave (22D) functioning as a cradle upon which the upper calandria tube rests upon.

7. The miniaturized nuclear reactor utilizing improved pressure tube structural members as described in claim 6, wherein the horizontal interior support pad further comprises: a horizontal interior support pad coating (22E), a horizontal interior support pad lining (22F), and a horizontal interior support pad cladding (22G).

8. The miniaturized nuclear reactor utilizing improved pressure tube structural members as described in claim 1, wherein the angular support pad (28) further comprises: an angular support pad top member (28A) and an angular support pad bottom member (28B), the angular support pad top member (28A) abutting the calandria tube (12), and the angular support pad bottom member (28B) securely fastened to the corner.

9. The miniaturized nuclear reactor utilizing improved pressure tube structural members as described in claim 1, wherein the horizontal exterior support pad (30) further comprises a horizontal exterior support pad end (30A), a horizontal exterior support pad fastener (30B), and a horizontal exterior support pad concave (30C), the horizontal exterior support pad fastener (30B) securely affixes the horizontal exterior support pad (30) to the reactor bottom wall, and the horizontal exterior support pad concave (30C) functioning as a cradle within which the calandria tube (12) rests.

10. The miniaturized nuclear reactor utilizing improved pressure tube structural members as described in claim 1, wherein the fuel bundle (40) further comprises:

A) a first fuel bundle proximal end plate (40AA) having a plurality of first fuel bundle proximal end plate fuel element end fasteners (40AAA), further having a plurality of first fuel bundle proximal end plate ports (40AAB), still further having a first fuel bundle proximal end plate indent (40AAC), yet still further having a first fuel bundle proximal end plate opening (40AAD);

B) a second fuel bundle distal end plate (40BA) having a plurality of second fuel bundle distal end plate fuel element end fasteners (40BAA), a plurality of second fuel bundle distal end plate ports (40BAB), a second fuel bundle distal end plate indent (40BAC) and a second fuel bundle distal end plate opening (40BAD);

C) a fuel bundle support (40D) having a fuel bundle support proximal end (40DA), a fuel bundle support proximal end spacer (40DB), a fuel bundle support distal end (40DC), a fuel bundle support distal end spacer (40DD), a fuel bundle support spacer tube (40DE), a fuel bundle support rod (40DF), and a fuel bundle support nut (40DG); and D) a plurality of fuel elements (40C) each having a proximal and distal end, the proximal end of each fuel element (40C) affixed within each of the first fuel bundle proximal end plate fuel element end fasteners (40AAA) and the distal end of each fuel element (40C) affixed within each of the second fuel bundle distal end plate fuel element end fasteners (40BAA).

11. The miniaturized nuclear reactor utilizing improved pressure tube structural members as described in claim 1, wherein the moderator (20) further comprises:

a) a moderator (20) having: a left top reactor wall, a right top reactor wall, a bottom left reactor wall, a bottom right reactor wall, a reactor front wall, a reactor back wall, a reactor upper left exterior side wall, a reactor lower left exterior side wall, a reactor upper right exterior side wall, a reactor lower right exterior side wall, at least one reactor horizontal interior wall having a reactor horizontal interior left and right wall, and at least one reactor vertical interior wall having a reactor vertical interior upper and lower wall, the moderator (20) divided into at least four compartments which comprise an upper left compartment, an upper right compartment, a lower left compartment, and a lower right compartment, the upper left compartment being bordered at the bottom by a reactor left horizontal interior wall and a reactor upper vertical interior wall and a reactor upper left exterior side wall and a reactor left top wall, the upper right compartment is bordered at the bottom by a reactor right horizontal interior wall and a reactor upper vertical interior wall and a reactor upper right exterior side wall and a reactor upper right top wall, the lower left compartment is bordered at the bottom by a reactor left bottom wall and a reactor left horizontal interior wall and a reactor lower vertical interior wall and a reactor lower left exterior side wall and a reactor left bottom wall, the lower right compartment is bordered at the bottom by a reactor right bottom wall and a reactor right horizontal interior wall and a reactor lower right exterior side wall and a reactor right bottom wall;

b) at least four calandria tubes (12) which comprise an upper left calandria tube, upper right calandria tube, a lower left calandria tube, and a lower right calandria tube contained within the upper left, upper right, lower left, and lower right compartments, respectively, of the moderator (20);

c) at least four fuel channel pressure tubes (14) each fuel channel pressure tube contained within each of the calandria tubes;

d) at least four fuel bundles (26) each fuel bundle contained within each of the fuel channel pressure tubes;

e) at least four fuel channel pressure tube pads (18) each fuel channel pressure tube pad positioned between each of the calandria tubes and each of the fuel channel pressure tubes;

f) at least two horizontal exterior support pad (30), one horizontal exterior support pad positioned on the left bottom reactor wall and the other horizontal exterior support pad positioned on the right bottom reactor wall, the horizontal exterior support pads (30) are positioned between the lower left and lower right calandria tubes and the bottom left and bottom right reactor walls, respectively;

g) at least four fuel bundle support pads (16), each bundle support pad positioned between each of the fuel bundles and each of the fuel channel pressure tubes;

h) at least two vertical support pads (24) which comprise an upper vertical support pad positioned on an upper reactor vertical interior wall between the upper left and upper right calandria tubes and a lower vertical support pad positioned on a lower reactor side wall between the lower left and lower right calandria tubes;

I) at least four angular support pads (28) which comprise an upper left angular support pad positioned on a corner formed between the reactor left top wall and the reactor upper left exterior side wall, the upper left angular support pad extending angularly from the corner and an upper right angular support pad positioned on a corner formed between the reactor right top wall and the reactor upper right exterior side wall, the upper right angular support pad extending angularly from the corner, and a lower left angular support pad positioned on a corner formed between the reactor left bottom wall and the reactor lower left exterior side wall, the lower left angular support pad extending angularly from the corner, and a lower right angular support pad positioned on a corner formed between the reactor right bottom wall and the reactor lower right exterior side wall, the lower right angular support pad extending angularly from the corner, the angular support pads functioning to maintain a space between the calandria tube and the reactor walls;

j) at least two horizontal interior support pads (22), one horizontal interior support pad positioned within the left reactor horizontal interior wall and the other horizontal interior support pad positioned within the right reactor horizontal interior wall, the left horizontal interior support pad functioning to maintain a space between the upper left and lower left calandria tubes, and right horizontal interior support pad functioning to maintain a space between the upper right and lower right calandria tubes;

k) at least one moderator system which comprises: at least one moderator inlet, at least one moderator outlet, at least one moderator pump, and at least one moderator cooler;

l) at least one coolant system which comprises: at least one coolant inlet, at least one coolant outlet, and at least one coolant gas fan; and m) at least one heat exchanger system which comprises: at least one inlet, at least one outlet, at least one turbine, at least one generator, at least one condenser, and at least one feed water pump.

12. The miniaturized nuclear reactor utilizing improved pressure tube structural members as described in claim 11, wherein the vertical support pad (24) further comprises at least two vertical support pads (24) which comprise an upper vertical support pad and a lower vertical support pad, the upper and lower vertical support pads are securely affixed within the reactor upper interior vertical wall and the reactor lower interior wall, respectively, each of the vertical support pads (24) having a vertical support pad proximal end (24A), a vertical support pad distal end (24B), a vertical support pad groove (24C), and a vertical support pad concave (24D), the vertical support pad groove (24C) fitting snugly around a upper reactor vertical interior wall and a lower reactor vertical interior wall, respectively, the vertical support pad concave (24D) of the upper vertical support pad functioning as a cradle upon which the interior sides of the upper left calandria tube and the upper right calandria tube rests upon, the lower vertical support pad functioning as a cradle upon which the interior sides of the lower left calandria tube and the lower right calandria tube rests upon.

13. The miniaturized nuclear reactor utilizing improved pressure tube structural members as described in claim 1, wherein the reactor further comprises: a least one joint connector (48) having a joint connector tread (48A), a joiner ring (50) with a joiner ring thread (50), the joint connector tread (48A) connects to the joiner ring thread (50) and a service tube (52) connected to the joiner ring (50) functioning for refueling of the reactor.

14. The miniaturized nuclear reactor utilizing improved pressure tube structural members as described in claim 2, wherein the calandria tubes further comprise a fuel compartment pressure tube (17) therebetween.

15. A miniaturized nuclear reactor utilizing improved pressure tube structural members comprising:

a) a moderator (20) having: a top reactor wall, a bottom reactor wall, a reactor front wall, a reactor back wall, and two reactor side walls:

b) at least one second calandria tube (112) having a plurality of second calandria tube compartments (112A) securely affixed around an inside perimeter contained within the moderator (20);

c) at least one second fuel channel pressure tube (114) having a plurality of second fuel channel pressure tube compartments (114A) securely affixed around an outside perimeter, the plurality of second calandria tube compartments (112A) and the plurality of second fuel channel pressure tube compartments (114A) opposing each other in an interlocking configuration, the at least one second fuel channel pressure tube (114) is contained within the at least one second calandria tube (112), d) at least one fuel bundle (26) contained within the at least one second fuel channel pressure tube (114);

e) at least one second fuel channel pressure tube support pad (113) having a second fuel channel pressure tube support pad end (113A), a second fuel channel pressure tube support pad spacer (113B), a second fuel channel pressure tube support pad concave (113C), a second fuel channel pressure tube support pad convex (113D), a second fuel channel pressure tube support pad groove (113E), and a second fuel channel pressure tube support pad opening (113F) positioned between the at least one calandria tube (12) and the at least one second fuel channel pressure tube (114);

f) at least one horizontal exterior support pad (30) positioned on the bottom reactor wall, the at least one horizontal exterior support pad (30) is positioned between the at least one second calandria tube (112) and the bottom reactor wall;

g) at least one fuel bundle support pad (16) positioned between the at least one fuel bundle (26) and the at least one fuel channel pressure tube (14);

h) at least one vertical support pad (24) positioned on a reactor side wall between the at least one calandria tube (12) and the reactor side wall;

i) at least one angular support pad (28) positioned on a corner formed between the reactor top wall and the reactor side wall, the at least one angular support pad (28) extending angularly from the corner, the at least one angular support pad functioning to maintain a space between the at least one calandria tube (12) and the reactor top and side walls;

j) at least one moderator system comprises: at least one moderator inlet, at least one moderator outlet, at least one moderator pump, and at least one moderator cooler;

k) at least one coolant system which comprises: at least one coolant inlet, at least one coolant outlet, and at least one coolant gas fan; and l) at least one heat exchanger system which comprises: at least one inlet, at least one outlet, at least one turbine, at least one generator, at least one condenser, and at least one feed water pump.

16. The miniaturized nuclear reactor utilizing improved pressure tube structural members as described in claim 15, wherein the at least one fuel bundle (26) is manufactured from glass.

* * * * *